(12) United States Patent
Wang et al.

(10) Patent No.: US 12,133,156 B2
(45) Date of Patent: Oct. 29, 2024

(54) METHOD AND BASE STATION FOR DETERMINING TRANSMISSION PATH IN WIRELESS COMMUNICATION SYSTEM

(71) Applicant: Samsung Electronics Co., Ltd., Suwon-si (KR)

(72) Inventors: Yanru Wang, Beijing (CN); Xiaoning Ma, Beijing (CN); Hong Wang, Beijing (CN); Lixiang Xu, Beijing (CN); Weiwei Wang, Beijing (CN); Lei Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 17/490,408

(22) Filed: Sep. 30, 2021

(65) Prior Publication Data

US 2022/0361086 A1   Nov. 10, 2022

Related U.S. Application Data

(63) Continuation of application No. PCT/KR2021/012277, filed on Sep. 9, 2021.

(30) Foreign Application Priority Data

May 7, 2021 (CN) .......................... 202110495960.X

(51) Int. Cl.
*H04W 40/24* (2009.01)
*H04W 28/06* (2009.01)
*H04W 40/12* (2009.01)

(52) U.S. Cl.
CPC ......... *H04W 40/248* (2013.01); *H04W 28/06* (2013.01); *H04W 40/12* (2013.01)

(58) Field of Classification Search
CPC .... H04W 40/248; H04W 28/06; H04W 40/12
See application file for complete search history.

(56) References Cited

U.S. PATENT DOCUMENTS

| 2012/0093019 A1* | 4/2012 | Zhang | H04L 45/42 370/252 |
| 2014/0098903 A1* | 4/2014 | Hoshino | H04B 7/0417 375/267 |

(Continued)

FOREIGN PATENT DOCUMENTS

| CN | 105517028 B | 3/2020 |
| CN | 111436091 A | 7/2020 |

(Continued)

OTHER PUBLICATIONS

International Search Report dated Jan. 26, 2022, issued in International Application No. PCT/KR2021/012277.

(Continued)

*Primary Examiner* — Mohammad S Anwar
(74) *Attorney, Agent, or Firm* — Jefferson IP Law, LLP

(57) ABSTRACT

A method and a base station for determining transmission paths are provided. The method includes determining that multiple transmission paths are to be configured for each of one or more terminals, and determining first configuration information of a terminal group corresponding to each terminal, which is used for configuring multiple transmission paths for a terminal in the terminal group. The disclosure reduces the complexity and computation amount of configuring transmission paths and improves the system performance.

20 Claims, 24 Drawing Sheets

(56) References Cited

U.S. PATENT DOCUMENTS

| | | |
|---|---|---|
| 2017/0202046 A1* | 7/2017 | Lee .................. H04W 4/08 |
| 2018/0302457 A1* | 10/2018 | Hassan ............... H04L 65/80 |
| 2018/0324642 A1 | 11/2018 | Yu et al. |
| 2019/0268799 A1 | 8/2019 | Hong et al. |
| 2020/0169941 A1 | 5/2020 | Chen |
| 2021/0022032 A1 | 1/2021 | Kim et al. |
| 2021/0377785 A1 | 12/2021 | Zhao |
| 2022/0015002 A1 | 1/2022 | Zhang et al. |
| 2022/0015184 A1 | 1/2022 | Wu |

FOREIGN PATENT DOCUMENTS

| | | |
|---|---|---|
| CN | 111465119 A | 7/2020 |
| JP | 2019-075743 A | 5/2019 |
| KR | 10-1981257 B1 | 8/2019 |
| KR | 10-2020-0004349 A | 1/2020 |
| KR | 10-2020-0115632 A | 10/2020 |
| WO | 2019/245447 A1 | 12/2019 |

OTHER PUBLICATIONS

European Search Report dated Mar. 25, 2024, issued in European Patent Application No. 21939901.1.
Extended European Search Report dated Jun. 17, 2024, issued in European Patent Application No. 21939901.1.

\* cited by examiner

FIG. 7D

FIRST STAGE GROUPING, BASED ON:
- SAME SERVICE TYPE
- SIMILAR PATH STATE VALUE OF MAIN PATH

| UE ID | SERVICE TYPE | PATH STATE OF MAIN PATH | FIRST STAGE GROUPING |
|---|---|---|---|
| UE 4 | URLLC | 38 | 1 |
| UE 5 | URLLC | 38 | 1 |
| UE 8 | URLLC | 37 | 1 |
| UE 6 | URLLC | 37 | 1 |
| UE 13 | URLLC | 37 | 1 |
| UE 7 | URLLC | 36 | 1 |
| UE 2 | URLLC | 35 | 1 |
| UE 11 | URLLC | 35 | 1 |
| UE 3 | URLLC | 38 | 2 |
| UE 1 | URLLC | 37 | 2 |
| UE 10 | URLLC | 30 | 3 |
| UE 12 | URLLC | 27 | 3 |
| UE 9 | URLLC | 25 | 3 |

THE SECOND-STAGE GROUPING BASED ON MEASUREMENT REPORT

| UE ID | NODE ID: CELL ID | NODE ID: CELL ID | NODE ID: CELL ID | SECOND-STAGE GROUPING |
|---|---|---|---|---|
| UE 4 | 3:3 | 3:1 | 4:2 | 1-A |
| UE 5 | 3:1 | 3:3 | 4:2 | 1-A |
| UE 8 | 3:3 | 3:1 | 4:2 | 1-A |
| UE 6 | 3:2 | 3:3 | 2:3 | 1-B |
| UE 13 | 3:2 | 3:3 | 2:3 | 1-B |
| UE 7 | 3:2 | 3:2 | 2:3 | 1-B |
| UE 2 | 3:1 | 3:2 | ... | 1-C |
| UE 11 | 3:3 | 3:2 | ... | 1-B |

[A:B] IN THE TABLE INDICATES THAT THE NODE ID IS A AND THE CELL ID IS B IS ONE RECORD [NODE ID: CELL ID] IN THE TABLE RESPONDS TO ONE PATH

REMOVE UE13 FROM GROUP 1-B BASED ON UE LOCATIONS, BECAUSE UE13 IS FAR AWAY FROM OTHER UES (UE6, UE11 AND UE7)

FINAL GROUPING

| UE ID | FINAL GROUPING |
|---|---|
| UE4 | 1-A |
| UE5 | 1-A |
| UE8 | 1-A |
| UE6 | 1-B |
| UE11 | 1-B |
| UE7 | 1-B |
| UE2 | 1-C |

METHOD AND BASE STATION FOR DETERMINING TRANSMISSION PATH IN WIRELESS COMMUNICATION SYSTEM

CROSS-REFERENCE TO RELATED APPLICATION(S)

This application is a continuation application, claiming priority under § 365(c), of an International application No. PCT/KR2021/012277, filed on Sep. 9, 2021, which is based on and claims the benefit of a Chinese patent application number 202110495960.X, filed on May 7, 2021, in the Chinese National Intellectual Property Administration, the disclosure of which is incorporated by reference herein in its entirety.

TECHNICAL FIELD

The disclosure relates to wireless communication systems. More particularly, the disclosure relates to a method and base station for determining a transmission path in a wireless communication system.

BACKGROUND

In order to meet the increasing demand for wireless data communication services since the deployment of fourth generation (4G) communication system, efforts have been made to develop improved fifth generation (5G) or pre-5G communication system. Therefore, 5G or pre-5G communication systems are also referred to "Beyond 4G network" or "post long term evolution (LTE) system".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive Multiple-Input Multiple-Output (MIMO), Full Dimensional MIMO (FD-MIMO), array antenna, analog beamforming and large-scale antenna are discussed in 5G communication systems.

In addition, in 5G communication systems, developments of system network improvement are underway based on advanced small cell, cloud Radio Access Network (RAN), ultra-dense network, device-to-device (D2D) communication, wireless backhaul, mobile network, cooperative communication, Coordinated Multi-Points (CoMP), reception-end interference cancellation, etc.

In 5G systems, hybrid frequency shift key (FSK) and quadrature amplitude modulation (QAM) modulation (FQAM) and Sliding Window Superposition Coding (SWSC) as Advanced Coding Modulation (ACM), and Filter Bank Multi Carrier (FBMC), Non-Orthogonal Multiple Access (NOMA) and Sparse Code Multiple Access (SCMA) as advanced access technologies have been developed.

In a Dual-Connectivity (DC) scenario, how to configure or determine the transmission path is a problem to be solved.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, aspect of the disclosure is to provide a method and a base station for determining transmission paths.

Additional aspects will be set forth in part in the description which follows and, in part, will be apparent from the description, or may be learned by practice of the presented embodiments.

In accordance with an aspect of the disclosure, a method for determining transmission paths performed by a base station is provided. The method includes determining that multiple transmission paths are to be configured for each of one or more terminals, and determining first configuration information of a terminal group corresponding to each terminal, the first configuration information being used for configuring multiple transmission paths for a terminal in the terminal group.

In some implementations, for example, determining that multiple transmission paths are to be configured for each of the one or more terminals includes determining that multiple transmission paths are to be configured for each of the one or more terminals based on at least one of information on quality of service (QoS) or information on a path state of a main transmission path of each of the one or more terminals, wherein the main transmission path is a transmission path when the terminal is not configured with multiple transmission paths.

In some implementations, for example, the determining that multiple transmission paths are to be configured for each of the one or more terminals based on at least one of the information on the QoS or the information on the path state of the main transmission path of each of the one or more terminals includes acquiring the information on the QoS and the information on the path state of the main transmission path of the terminal, and determining that multiple transmission paths are to be configured for the terminal, in response to the value indicated by the information on the QoS being smaller than or equal to a predetermined first threshold value or the evaluation value determined based on the information on the path state of the main transmission path being smaller than or equal to a predetermined second threshold value.

In some implementations, for example, the information on the path state of the main transmission path includes at least one of a channel quality indicator (CQI) of the main transmission path, a hybrid automatic repeat request (HARQ) failure rate of the main transmission path, or an HARQ retransmission rate of the main transmission path.

In some implementations, for example, the evaluation value determined by the information on the path state of the main transmission path is determined by $PS\_E = V\_CQI*(1-R1\_HARQ)*2^{(2-R2\_HARQ)}$, wherein $PS\_E$ indicates the evaluation value, $V\_CQI$ indicates the value indicated by the CQI, $R1\_HARQ$ indicates the HARQ failure rate, and $R2\_HARQ$ indicates the HARQ retransmission rate.

In some implementations, for example, the information on the QoS includes at least one of a delay related to a packet data convergence protocol (PDCP) transmission or a packet loss rate related to the PDCP transmission.

In some implementations, for example, determining the first configuration information of the terminal group corresponding to each terminal includes determining the terminal group corresponding to each terminal based on at least one of the path state of the main transmission path, a signal quality measurement result, a geographical location or service type of each terminal among the one or more terminals, or acquiring the first configuration information of the terminal group.

In some implementations, for example, determining the terminal group corresponding to each terminal includes grouping based on the path state of the main transmission path and the service type of each of the one or more terminals to obtain at least one first terminal group, and for the at least one first terminal group, selecting candidate transmission paths for each terminal based on the signal quality measurement result of each terminal in the first terminal group, and grouping terminals with same candidate transmission paths in the first terminal group into a first terminal subgroup as one of multiple terminal groups.

In some implementations, for example, the candidate transmission path includes a transmission path whose signal quality is higher than a predetermined third threshold value. For example, the signal quality includes at least one of a reference signal received power (RSRP), a reference signal received quality (RSRQ), or a signal to interference plus noise ratio (SINR).

In some implementations, for example, the grouping the terminals with the same candidate transmission paths in the first terminal group into the first terminal subgroup as one of multiple terminal groups includes removing one or more terminals from the first terminal subgroup based on the geographical location of each terminal in the first terminal group, and taking the first terminal subgroup after removing the one or more terminals as one of multiple terminal groups.

In some implementations, for example, the grouping the terminals in the one or more terminals into the terminal group based on at least one of the path state of the main transmission path, the measurement report, the geographical location or the service type of each of the one or more terminals includes grouping the terminals in the one or more terminals into the terminal group by using a first artificial intelligence model. The first artificial intelligence model is trained to output information on the terminal group based on at least one of the path state of the main transmission path, the measurement report, the geographical location or the service type of each of the one or more terminals as an input.

In some implementations, for example, the determining the first configuration information includes determining multiple transmission paths for each terminal in the terminal group, wherein determining multiple transmission paths for each terminal in the terminal group includes repeatedly performing an operation of selecting a transmission path with a highest signal quality that has not been selected from among candidate transmission paths of the terminal until a preset condition is satisfied, and determining the selected one or more transmission paths as multiple transmission paths for each terminal in the terminal group, and wherein the main transmission path is determined as a primary path.

In some implementations, for example, if an assisting node has been determined, when selecting the transmission path with the highest signal quality that has not been selected from among the candidate transmission paths of the terminal, the selection is made only from transmission paths related to a hosting node and transmission paths related to the determined assisting node.

In some implementations, for example, if the assisting node has not been determined, when selecting the transmission path with the highest signal quality that has not been selected from among the candidate transmission paths of the terminal, the selection is made from the transmission paths related to the hosting node and transmission paths related to other nodes.

In some implementations, for example, in case that the selected transmission path is not in the hosting node and the assisting node has not been determined, determining that the node where the transmission path is located as the assisting node.

In some implementations, for example, the determining multiple transmission paths for each terminal in the terminal group includes determining multiple transmission paths for each terminal in the terminal group by using a second artificial intelligence model. The second artificial intelligence model is trained to output the first configuration information based on at least one of the path state of the main transmission path, the measurement report, the geographic location or the service type of each terminal in the terminal group as the input or based on at least one of an average measurement report or a service type of the terminal group as the input. The average measurement report includes at least one of the RSRP, RSRQ, or the SINR.

In some implementations, for example, the preset condition includes at least one of a sum of the signal quality of the selected one or more transmission paths being greater than a predetermined fourth threshold value, or the number of the selected one or more transmission paths reaching a predetermined fifth threshold value. For example, the signal quality is determined based on a measurement report including at least one of an RSRP, an RSRQ, or an SINR.

In some implementations, for example, the first configuration information includes one or more of identification information of the assisting node, identification information of a transmission path related to the hosting node among the selected one or more transmission paths, or identification information of a transmission path related to the assisting node among the selected one or more transmission paths.

In some implementations, for example, if the value indicated by the information on the QoS of at least one of the one or more terminals is smaller than a sixth threshold value during a predetermined time period, the terminal group corresponding to the at least one terminal is re-determined.

In some implementations, for example, the sixth threshold value is greater than a value corresponding to a QoS requirement of the PDCP transmission.

In some implementations, for example, determining configuration information of at least one terminal grouped into a terminal group among the one or more terminals includes determining multiple transmission paths for each terminal in the terminal group, wherein multiple transmission paths for each terminal in the terminal group are determined by a third artificial intelligence model. The configuration information includes one or more of the identification information of the assisting node, the identification information of the transmission path related to the hosting node among the selected one or more transmission paths, or the identification information of the transmission path related to the assisting node among the selected one or more transmission paths.

In some implementations, for example, the method further includes receiving information on the path state of the one or more transmission paths related to the assisting node from the assisting node.

In some implementations, for example, for each transmission path among the one or more transmission paths related to the assisting node, the information on the path state of the transmission path is not transmitted by the assisting node, in response to the evaluation value determined based on the information on the path state of the transmission path being greater than a seventh threshold value and the path state of the transmission path being maintained for more than or equal to a first predetermined time.

In some implementations, for example, it is determined whether to activate packet duplication based on the path state of the one or more transmission paths related to the hosting node and the path state of the one or more transmission paths related to the assisting node.

In some implementations, for example, the path state of the one or more transmission paths related to the hosting node includes the path state of the one or more transmission paths related to the hosting node at a latest moment or the path state of the one or more transmission paths related to the hosting node at a current moment.

In some implementations, for example, the path state of the one or more transmission paths related to the assisting node reported by the assisting node includes the path state of the one or more transmission paths related to the assisting node at the latest moment or the path state of the one or more transmission paths related to the assisting node at the current moment.

In some implementations, for example, the method further includes selecting multiple transmission paths for data packet duplication transmission based on the path state of the one or more transmission paths related to the hosting node and the path state of the one or more transmission paths related to the assisting node.

In some implementations, for example, whether to activate data packet duplication and select multiple transmission paths for data packet duplication transmission is determined by a fourth artificial intelligence model. The fourth artificial intelligence model is trained to output information on whether to activate data packet duplication and information on multiple transmission paths for data packet duplication transmission based on the path state of the one or more transmission paths related to the hosting node and the path state of the one or more transmission paths related to the assisting node as inputs.

In some implementations, for example, the method further includes transmitting second configuration information to the at least one terminal, the second configuration information including the information on whether to activate data packet duplication and the information on multiple transmission paths for data packet duplication transmission.

In some implementations, for example, the second configuration information is transmitted to the at least one terminal via a medium access control (MAC) control element (CE) or a radio resource control (RRC) message.

In some implementations, for example, the method further comprises, in response to determining that one of the at least one terminal satisfies a predetermined condition for a continuous second predetermined time, disabling multiple transmission paths of the terminal configured by the first configuration information.

In some implementations, for example, the predetermined condition includes at least one of the following: the selected transmission path for the terminal includes the primary path and meets the QoS requirement of the PDCP transmission, or the value indicated by the information on the QoS is greater than or equal to a predetermined eighth threshold value.

In some implementations, for example, it further includes transmitting the first configuration information to the at least one terminal.

In some implementations, for example, it further includes transmitting the first configuration information to the at least one terminal via a MAC CE or a radio resource control (RRC) message.

In accordance with another aspect of the disclosure, a base station is provided. The base station includes a transceiver configured to transmit and receive signals, and a controller coupled to the transceiver and configured to perform one or more operations of the above-described method performed by the base station.

In accordance with another aspect of the disclosure, a method performed by a base station is provided. The method includes acquiring a path state of a transmission path of the base station, and determining whether to report the path state based on whether the path state satisfies a predetermined condition.

In some implementations, for example, the determining whether to report the path state based on whether the path state satisfies the predetermined condition includes determining not to report the path state of the transmission path when an evaluation value determined based on the path state of the transmission path is greater than (or equal to) a threshold value and the path state of the transmission path is maintained for more than or equal to a predetermined time.

In some implementations, for example, when the evaluation value determined based on the path state of the transmission path is smaller than or equal to the threshold value and the path state of the transmission path is maintained for less than (or equal to) a predetermined time, it is determined to report the path state of the transmission path.

In some implementations, for example, the method further comprises, when it is determined to report the path state of the transmission path, reporting the path state to another base station.

In some implementations, for example, the base station may be an assisting node of a dual connectivity configured for the terminal, and the other base station may be a hosting node of the dual connectivity.

In accordance with another aspect of the disclosure, a base station is provided. The base station includes a transceiver configured to transmit and receive signals, and a controller coupled to the transceiver and configured to perform one or more operations of the above-described method performed by the base station.

In accordance with another aspect of the disclosure, a computer-readable storage medium having one or more computer programs stored thereon, the one or more computer programs may implement any one of the methods described above when executed by one or more processors is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 7D shows a schematic diagram of a method for grouping UEs that need to be configured with multi-path according to an embodiment of the disclosure;

The same reference numerals are used to represent the same elements throughout the drawings.

DETAILED DESCRIPTION

Figure 1:
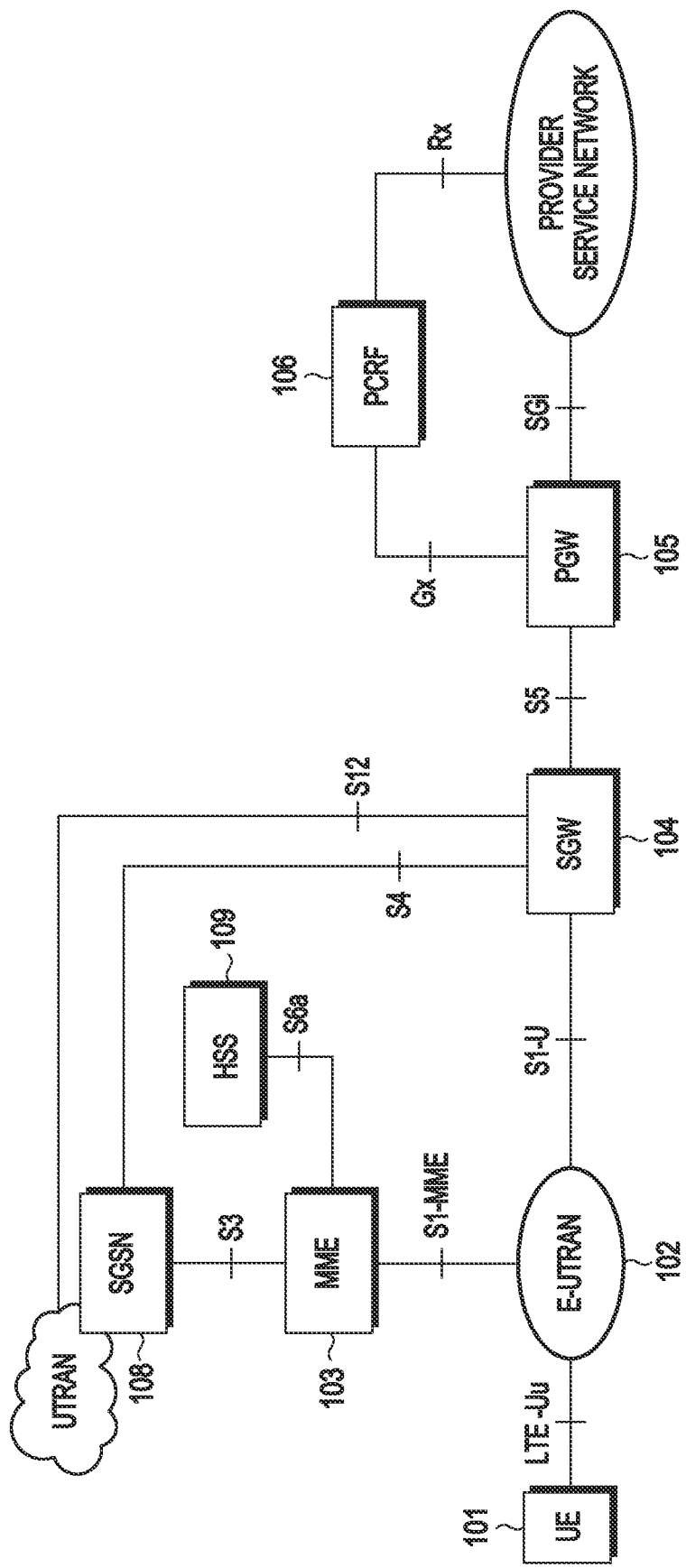
FIG. 1 is a system architecture of System Architecture Evolution (SAE) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces The term "couple" and its derivatives refer to any direct or indirect communication between two or more elements, no matter whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as Read-Only Memory (ROM), Random Access Memory (RAM), a hard disk drive, a Compact Disc (CD), a Digital Video Disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It should be understood that "first", "second" and similar words used in the disclosure do not express any order, quantity or importance, but are only used to distinguish different components. Unless otherwise indicated by the context clearly, similar words such as "a", "an" or "the" in a singular form do not express a limitation of quantity, but express an existence of at least one.

As used herein, any reference to "one example" or "example", "one embodiment" or "embodiment" means that particular elements, features, structures or characteristics described in connection with embodiment is included in at least one embodiment. The phrases "in one embodiment" or "in one example" appearing in different places in the specification do not necessarily refer to the same embodiment.

It will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "upper", "lower", "left" and "right" are only used to express a relative positional relationship, and when an absolute position of the described object changes, the relative positional relationship may change accordingly.

The various embodiments discussed below for describing the principles of the disclosure in the patent document are for illustration only and should not be interpreted as limiting the scope of the disclosure in any way. Those skilled in the art will understand that the principles of the disclosure can be implemented in any suitably arranged wireless communication system. For example, although the following detailed description of embodiments of the disclosure will be directed to long term evolution (LTE) and fifth generation (5G), those skilled in the art can understand that the primary points of the disclosure can also be applied to other communication systems with similar technical backgrounds and channel formats with slight modifications without departing from the scope of the disclosure.

In the description of the disclosure, when it is considered that some detailed explanations about functions or configurations may unnecessarily obscure the essence of the disclosure, these detailed explanations will be omitted. All terms (including descriptive or technical terms) used herein should be interpreted as having obvious meanings to those of ordinary skill in the art. However, these terms may have different meanings according to the intentions of those of ordinary skill in the art, precedents, or the emergence of new technologies, and therefore, the terms used herein must be defined based on the meanings of these terms together with the description throughout the specification. Hereinafter, for example, the base station may be at least one of: a next generation node B (gNode B (gNB)), an evolved node B (eNode B (eNB)), a Node B, a radio access unit, a base station controller, or a node on the network. For example, the terminal may include a user equipment (UE), a mobile station (MS), a mobile phone, a smart phone, a computer, or a multimedia system capable of performing communication functions.

Hereinafter, embodiments of the disclosure will be described in detail with reference to the accompanying drawings. It should be noted that the same reference numerals in different drawings will be used to refer to the same elements already described.

FIG. 1 is a system architecture of System Architecture Evolution (SAE) according to an embodiment of the disclosure.

Referring to FIG. 1, in an SAE 100, a UE 101 is a terminal device for receiving data. An evolved universal terrestrial radio access network (E-UTRAN) 102 is a radio access network, which includes an eNB (or NodeB) that provides the UE with access to the radio network interface. A mobility management entity (MME) 103 is responsible for managing mobility context, session context and security information of the UE. A serving gateway (SGW) 104 primarily provides a function of user plane, and the MME 103 and the SGW 104 may be in a same physical entity. A packet data network gateway (PGW) 105 is responsible for charging, lawful interception and other functions, and may be in a same physical entity as SGW 104. A policy and charging rules functional entity (PCRF) 106 provides quality of service (QoS) policies and charging criteria. A general packet radio service support node (SGSN) 108 is a network node device that provides routing for data transmission in a universal mobile telecommunications system (UMTS). A home subscriber server (HSS) 109 is a home subsystem of the UE, and is responsible for protecting user information including a current location of the user equipment, an address of a serving node, user security information, and a packet data context of the user equipment and so on.

Figure 2:
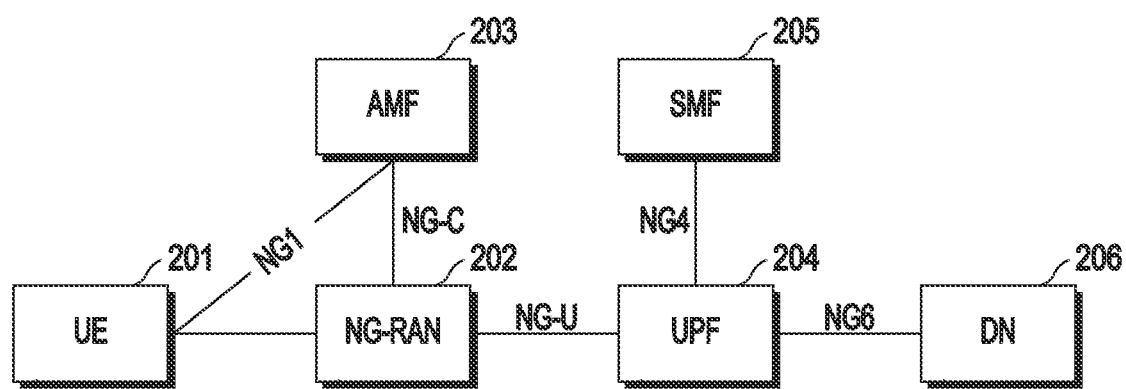
FIG. 2 is a system architecture according to an embodiment of the disclosure.

FIG. 2 is a system architecture according to an embodiment of the disclosure. Other embodiments of the system architecture can be used without departing from the scope of this disclosure.

Referring to FIG. 2, in a system architecture 200, a UE 201 is a terminal device for receiving data. A next generation radio access network (NG-RAN) 202 is a radio access network, which includes a base station (a gNB or eNB connected to a 5G core network (5GC), and the eNB connected to 5GC is also referred to as a ng-gNB) that provides the UE with access to the radio network interface. An access control and mobility management functional entity (AMF) 203 is responsible for managing mobility context and security information of the UE. A user plane function entity (UPF) 204 primarily provides a function of the user plane. A session management functional entity SMF 205 is responsible for session management. A data network (DN) 206 includes, for example, services of operators, access of Internet and services of third parties and so on.

Various embodiments of the disclosure are further described below with reference to the accompanying drawings. For convenience of illustration, some terms and names defined in the 3rd generation partnership project (3GPP), LTE, LTE-Advanced (LTE-A), 5G and New Radio (NR) standards may be used. However, the details of this disclosure are not limited by terms and names according to standards, and can be equally applied to systems according to other standards.

Hereinafter, the terminal may include a UE, a mobile station (MS), a cellular phone, a smart phone, a computer, or a multimedia system capable of performing communication functions. In addition, hereinafter, the base station may include an eNB, a gNB, a node B, a radio access unit, a transmitting and receiving point (TRP), or a node. For example, the gNB may include a gNB-concentration unit (CU) (e.g., gNB-CU-user plane (UP) or gNB-CU-control plane (CP)) or a gNB-distribution unit (DU).

Wireless communication systems that have provided voice-oriented services in the early days have evolved into broadband wireless communication systems that provide packet data services of high-speed and high quality based on communication standards such as high-speed packet access (HSPA), long term evolution (LTE) (or evolved universal terrestrial radio access, E-UTRA), LTE-A, LTE-Pro of 3GPP, high-rate packet data (HRPD), ultra-mobile broadband (UMB) of 3GPP2, and IEEE 802.16e.

In a NR system as a representative example of a broadband wireless communication system, a downlink (DL) adopts an orthogonal frequency division multiplexing (OFDM) scheme, and an uplink (UL) adopts a single carrier frequency division multiple access (SC-FDMA) scheme or a discrete Fourier transform spread OFDM (DFT-S-OFDM) scheme. The uplink refers to a wireless link through which a terminal transmits data or control signals to a base station, while the downlink refers to a wireless link through which a base station transmits data or control signals to a terminal. In the above-described multiple access scheme, by performing allocation and operation so that time-frequency resources for carrying data or control information of each terminal do not overlap with each other (i.e., so that orthogonality is established), the data or control information of each user is different from each other.

As the 5G communication system needs to freely reflect various requirements of users and service providers and so on, it needs to support services that meet various requirements. Services being considered in the 5G communication system include enhanced mobile broadband (eMBB) communication, massive machine-type communication (mMTC), ultra-reliable low-latency communication (URLLC) and so on.

The eMBB aims to provide a higher data transmission rate than that supported by traditional LTE, LTE-A or LTE-Pro. For example, in a 5G communication system, from the perspective of a base station, the eMBB needs to support a peak data rate of 20 Gbps for the downlink and a peak data rate of 10 Gbps for the uplink. At the same time, the 5G communication system needs to provide increased user equipment perceived data rate. In order to meet these requirements, 5G communication systems need enhanced transmission or reception technologies, including enhanced multiple-input multiple-output (MIMO) transmission technologies. In addition, the LTE uses a frequency band of 2 GHz, while the 5G communication system uses a wider band of 20 MHz in a frequency band of 3 GHz to 6 GHz or a frequency band higher than 6 GHz, so that the required data rate can be met.

In 5G communication systems, mMTC is considered to support application services such as Internet of Things (IoT). In order to effectively provide the Internet of Things, mMTC needs to meet the requirements such as large-scale terminal connection support in the cell, increased terminal coverage, increased battery life and reduced terminal cost. Since the Internet of Things is connected to a plurality of sensors and various devices to provide communication functions, the Internet of Things needs to support a large number of terminals in a cell (for example, there are 1,000,000 terminals per square kilometer). In addition, terminals supporting mMTC are likely to be located in shielded areas (such as basements of buildings) that cannot be covered by cells due to service characteristics, so they may need wider coverage than other services provided in 5G communication systems. Terminals supporting mMTC need to be configured as low-cost terminals, and because it is difficult to replace the terminals' batteries frequently, very long battery life is required.

In a 5G communication system, URLLC is a cellular-based wireless communication service for specific (mission-critical) purposes, and this service can be used for remote control of robots or mechanical devices, industrial automation, drones, telemedicine, emergency alarms, etc., thereby providing communication with very low latency and very high reliability. For example, the service supporting URLLC needs to meet a radio access delay (air interface delay) shorter than 0.5 ms, and also needs a packet error rate of $10^{-5}$ or less. Therefore, for services supporting URLLC, the 5G system needs to provide a smaller transmission time interval (TTI) than other services, and must also meet the design requirements of allocating a wide range of resources in the frequency band. However, the above mMTC, URLLC and eMBB are only examples of different service types, and the service types to which the disclosure is applied are not limited to the above examples.

Services considered in the above 5G communication system need to be provided through mutual integration based on one framework. That is to say, for effective resource management and control, it is preferable that respective services are integrated and controlled as a system and transmitted instead of being operated independently.

In addition, hereinafter, embodiments will be described as examples of the LTE, LTE-A, LTE Pro or NR systems, but the embodiments can also be applied to other communication systems with similar technical backgrounds or channel types. In addition, referring to the determination of those skilled in the art, embodiments can be modified to be applied to other communication systems without significantly departing from the scope of the disclosure.

Figure 3:
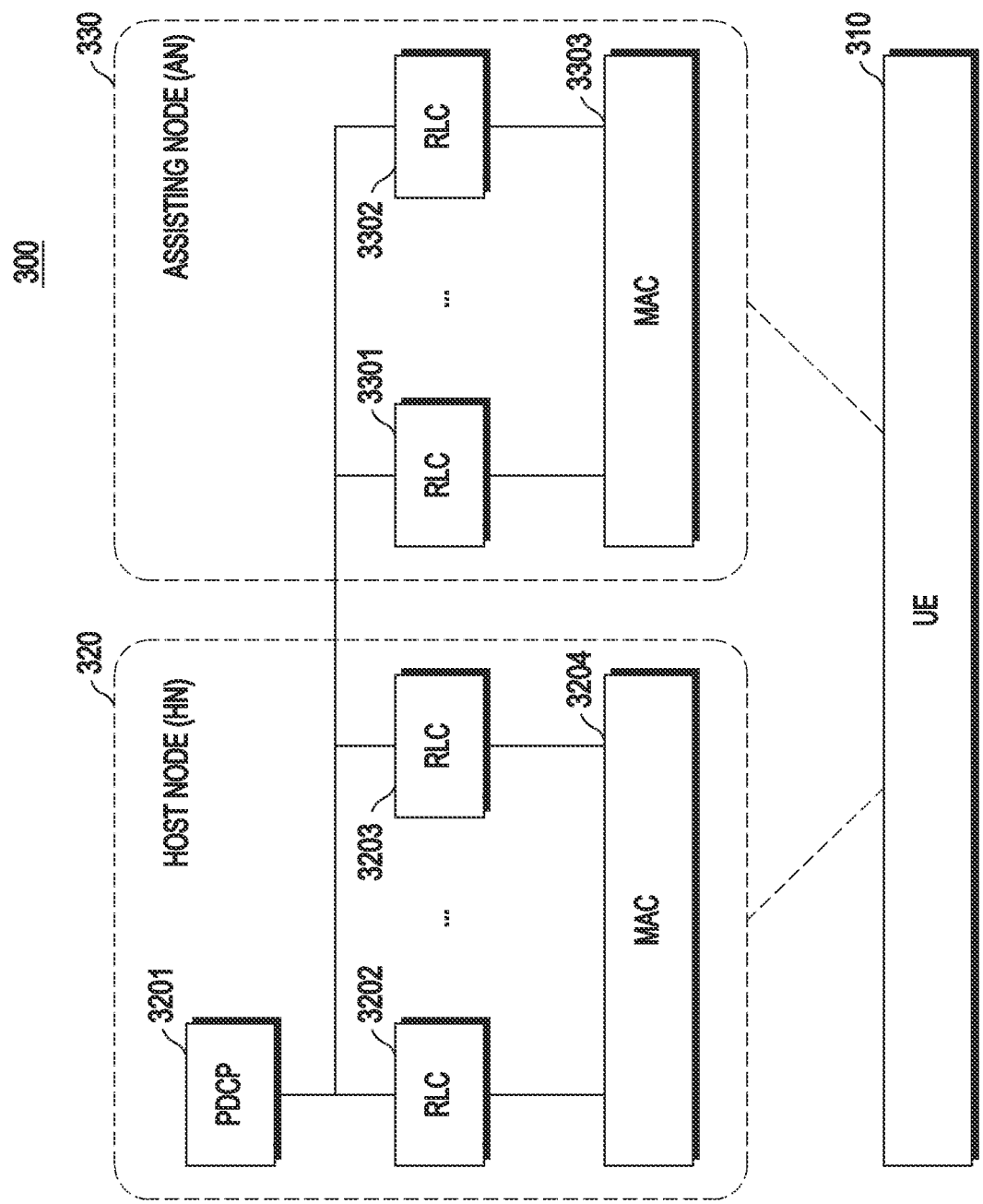
FIG. 3 is a schematic diagram of a system in which a UE establishes wireless connections with different nodes at the same time according to an embodiment of the disclosure.

FIG. 3 shows a schematic diagram of a Dual-Connectivity (DC) according to an embodiment of the disclosure.

A dual connectivity (DC) corresponds to a case where a UE is connected to two nodes (e.g., base stations) at the same time and communicates using radio resources provided by each node (e.g., a base station). As DC is configured for the UE, the throughput and data rate provided to the UE can be increased. In some examples, in a DC, a node that owns a PDCP entity (i.e., hosting PDCP entity) is referred to a hosting node (HN), and a node that interacts with the hosting node for flow control is referred to an assisting Node (AN).

Referring to FIG. 3, except for case 300 shown, other DC scenarios such as NG-RAN E-UTRA-NR Dual Connectivity (NGEN-DC), NR-E-UTRA dual connectivity (NE-DC) and NR-NR dual connectivity (NR-DC) can also be considered according to a core network and a radio access technology of two nodes to which UE connects, and the above other DC scenarios can be collectively referred to as multi-radio dual connectivity (MR-DC). The above-mentioned EN-DC may represent an MR-DC scenario involving a connection to EPC.

As described above, various scenarios in DC can be considered. Hereinafter, some embodiments may be described taking the EN-DC as an example. However, those skilled in the art can understand that embodiments of the disclosure can be applied to various DC scenarios. In addition, those skilled in the art can understand that embodiments of the disclosure can be applied to scenarios similar to the DC scenarios, for example, carrier aggregation scenarios. For example, in the case of carrier aggregation, the UE can access two or more cells. Particularly, when UE accesses two cells including a primary cell and a secondary cell, the primary cell (or the base station of the primary cell) may correspond to the hosting node, and the secondary cell (or the base station of the secondary cell) may correspond to the assisting node; or, the primary cell (or the base station of the primary cell) may correspond to the assisting node, and the secondary cell (or the base station of the secondary cell) may correspond to the hosting node.

With continued reference to FIG. 3, the hosting node 320 may include a Packet Data Convergence Protocol (PDCP) entity (e.g., PDCP 3201), multiple Radio Link Control (RLC) entities (e.g., RLC 3202, RLC 3203D, etc.), and a MAC entity (e.g., MAC 3204). Similarly, the assisting node 330 may include multiple RLC entities (e.g., RLC 3302, RLC 3303, etc.) and a MAC entity (e.g., MAC 3304). Accordingly, there may be multiple transmission paths at the hosting node for communicative transmission with the UE 310, for example, a transmission path via PDCP 3201, RLC 3202 and MAC 3204, a transmission path via PDCP 3201, RLC 3203 and MAC 3204, and so on. For example, there may be multiple transmission paths at the assisting node for communicative transmission with the UE 310, including a transmission path via PDCP 3201, RLC 3301 and MAC 3303, a transmission path via PDCP 3201, RLC 3302 and MAC 3303, and so on. In embodiments of the disclosure, the terms "path" and "transmission path" can be used interchangeably. For example, in the case where a PCDP (e.g., NR PDCP) of HN 320 transmits or receives downlink/uplink data packets to or from UE 310, the connection from the PDCP to the UE via a RLC (e.g., a RLC of HN 320 (e.g., a NR PDCP) or a RLC of AN 330 (e.g., an EUTRA RLC)) may be referred to as a "path" or a "transmission path". Particularly, for example, the "path" and "transmission path" between the UE and the network may refer to the user plane path between the UE and the network. It should be noted that FIG. 3 and its corresponding description are for illustration only, and embodiments of the disclosure are not limited to the situation shown in FIG. 3.

Under DC, the transmission path between the node (the hosting node and the assisting node) and the UE may include multiple RLC entities, including one primary RLC entity and at least one secondary RLC entity. In an embodiment of the disclosure, one RLC entity may correspond to one transmission path (e.g., a logical channel), and the transmission path corresponding to the primary RLC entity may be referred to as a primary transmission path (e.g., a primary logical channel). In an embodiment of the disclosure, the primary RLC entity may refer to an RLC entity or transmission path through which transmission is performed when packet duplication is not configured.

In an embodiment of the disclosure, the primary RLC entity or main transmission path may refer to an RLC entity or transmission path through which transmission is performed when the UE is not configured with multiple transmission paths and is configured with only a single path (for example, not in DC).

In an embodiment of the disclosure, when packet duplication or PDCP duplication is configured, transmission of a same PDCP packet is performed through each of multiple transmission paths (or a plurality of logical channels).

In release 15 of 3GPP, a single UE can be configured with at most two paths to transmit PDCP duplicated packets to improve transmission reliability. In release 16, a single UE can be configured with up to four paths, and some or all of the configured paths can be selected to transmit PDCP duplicated packets.

In release 15, each UE is configured with at most two paths.

Figure 4:
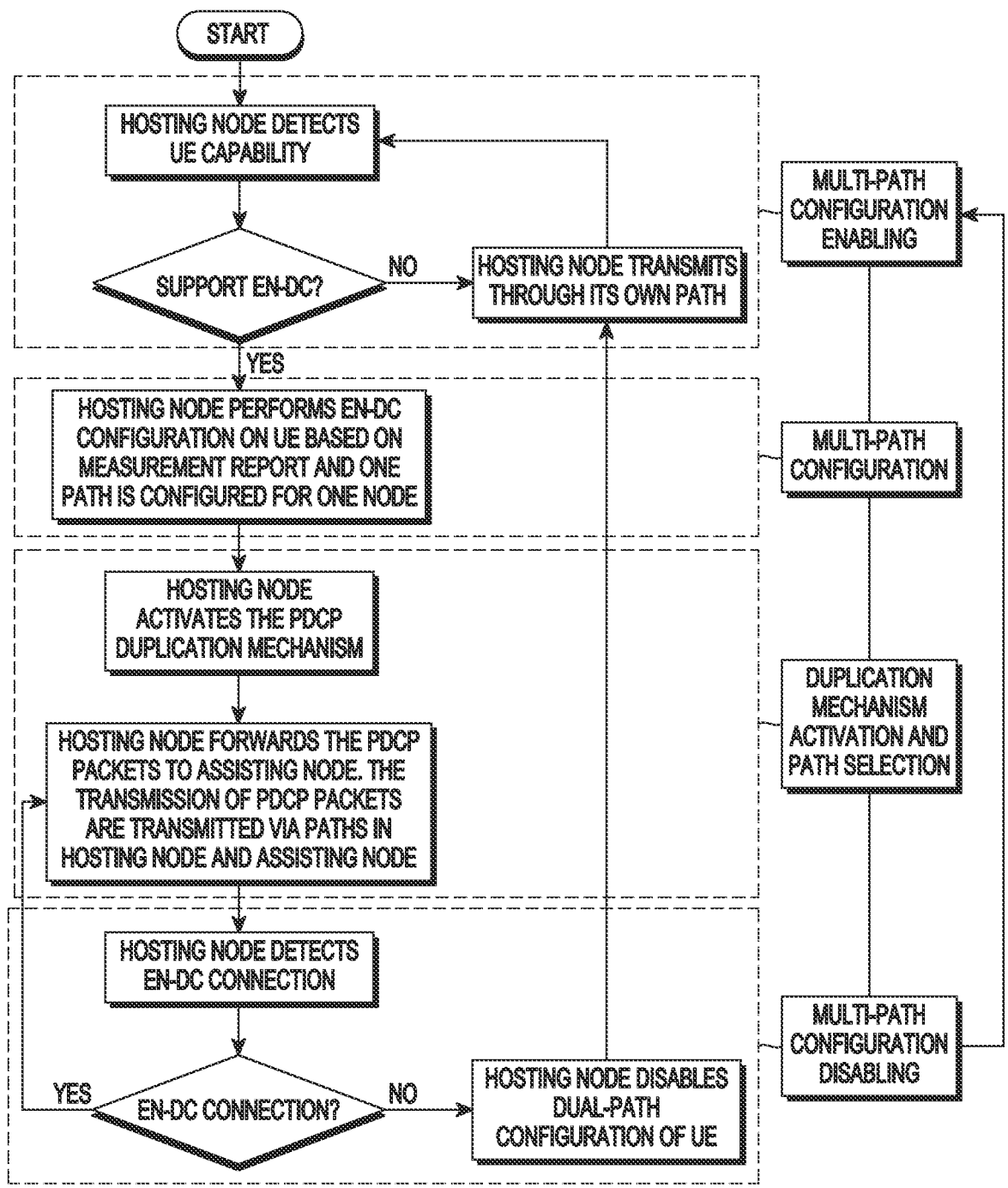
FIG. 4 is a flowchart illustrating a dual path configuration and a path selection method according to an embodiment of the disclosure.

FIG. 4 is a flowchart illustrating a dual path configuration and a path selection method according to an embodiment of the disclosure.

Referring to FIG. 4, the path configuration and path selection can be divided into the following four steps:

Multi-path configuration enabling: the Hosting node (HN) enables dual-path configuration for all user equipment (UE) supporting EN-DC. For example, the hosting node detects the UE capability, and if the UE supports EN-DC, it performs multi-path configuration for the UE. If the UE does not support EN-DC, the hosting node transmits through its own path.

Multi-path configuration: a HN independently configures dual paths for each UE supporting EN-DC based on UE measurement reports, in which one path is configured on the HN and another path is configured on an Assisting node (AN). For example, the hosting node performs EN-DC configuration on the UE according to the measurement report, and one path is configured on one node.

Duplication mechanism activation and path selection:

Method 1: using the configured dual paths for all transmissions of the UE.

Method 2: For a certain UE, the HN activates the duplication mechanism and uses the configured dual paths for transmission after detecting packet loss.

Multi-path configuration disabling: When the HN detects that EN-DC cannot be configured for the UE, the dual-path configuration is disabled. For example, the hosting node may detect an EN-DC connection, and if there is no EN-DC connection, the hosting node disables the dual-path configuration of the UE, that is, stop to configure dual-path for this UE. If there is an EN-DC connection, the hosting node transmits a PDCP data packet to the assisting node, and performs transmission of PDCP duplicate packets on the path of the hosting node and the assisting node.

Figure 5:
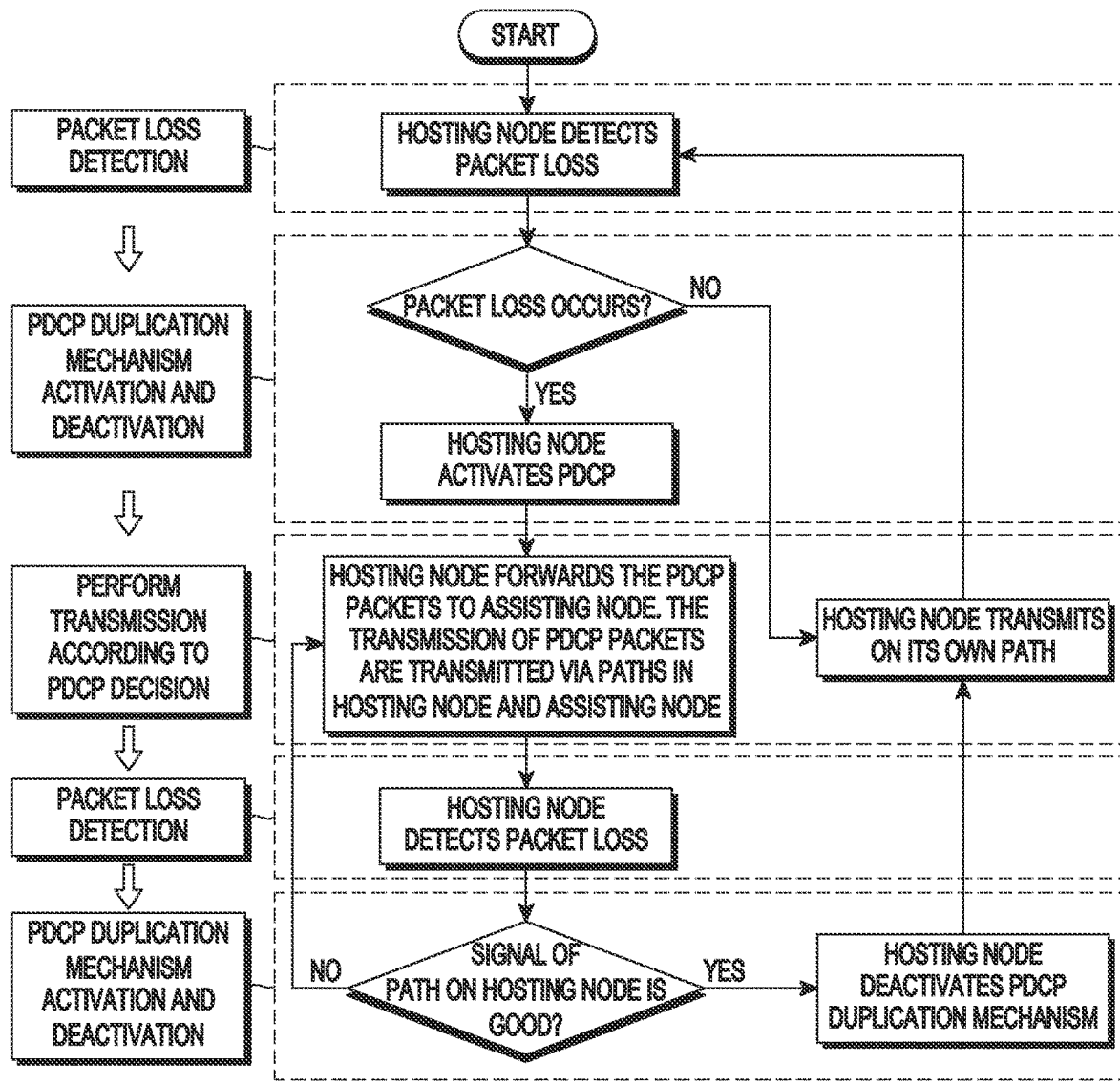
FIG. 5 is a flowchart illustrating a path selection method according to an embodiment of the disclosure.

FIG. 5 shows a flowchart of a method of duplication mechanism activation and path selection according to an embodiment of the disclosure.

Referring to FIG. 5, the hosting node detects packet loss (e.g., data packets that are not successfully transmitted). If packet loss is detected, it is determined whether to transmit the lost packet. If it is determined to transmit the lost packet, the hosting node activates PDCP duplication. The hosting node then transmits PDCP data packets to the assisting node, and performs transmission of the PDCP duplicate packets on the path of the hosting node and the assisting node. Then, the hosting node transmits the PDCP data packets to the assisting node, and performs the transmission of the PDCP duplicate packets on the path of the hosting node and the assisting node. The hosting node continues to detect packet loss (e.g., data packets that are not successfully transmitted). The hosting node deactivates PDCP duplication if it is determined that the signal of the path on the hosting node is good.

For path state reporting, one possible mechanism is static reporting, that is, the HN transmits the path state reporting configuration to the AN, and the AN reports based on the configuration of the HN. The report configuration includes a report type, a report interval and a report content.

Individual path configuration for a single UE may lead to high computational burden and complexity, resulting in low configuration efficiency. For example, when the number of configured paths is greater than 2 (e.g., 4), there are many path configurations of UE, and the following problems need to be solved. One problem is which node to choose as the AN. Another problem is how many paths to configure on the HN and the AN respectively (for example, 1 path on the HN and 3 paths on the AN; Or 2 paths on the HN and 2 paths on the AN; or 3 paths on the HN and 1 path on the AN; or 1 path on HN or 2 paths on the AN; or 2 paths on the HN and 1 path on the AN; or 1 path on the HN and 1 path on the AN; etc.). Yet another problem is which paths to be configured on the HN and the AN.

If multiple transmission paths are configured for each UE individually, the computational complexity is large for a high-density network of the NR. On one hand, all configured paths being used for the PDCP duplication transmission leads to high resource consumption. Different services have different QoS requirements. Under different QoS requirements and different path states, subset of configured paths being used for the PDCP duplicated packet transmission can meet the QoS requirements. If all configured paths are used for transmission at all times, the resource consumption would be high. On the other hand, activating the PDCP duplication mechanism according to the detection of packet loss may lead to lower reliability. For example, when the PDCP duplication mechanism is deactivated after the packet loss has occurred, the reliability has already declined. For 5G URLLC communication services, the reliability of this scheme cannot meet the requirements. On another hand, if all UEs supporting dual connectivity are configured with multiple paths, it leads to low resource utilization/efficiency and the small number of connected UEs. For example, when the path state is good or the QoS requirement is low, the single-path configuration (in which only a single transmission path is configured) can meet the QoS requirements. In this case, configuring multiple paths for the UE leads to a waste of resources, and when the number of configured paths is high, the resource utilization/efficiency is too low, resulting in the low number of connected UEs for the base station with limited resources. On yet another hand, static reporting of the path state leads to unnecessary reporting, resulting in low efficiency of reporting resources. Due to the dynamic change of the channel state, static reporting of AN cannot be changed adaptively. If the channel state is in a good state for a long time, there is no need to report repeated information. Therefore, the static reporting of the path state will lead to low efficiency of reporting resources.

In order to solve at least one or more of the above technical problems, an embodiment of the disclosure proposes a path configuration and selection method for PDCP duplication (for example, for URLLC services) in a wireless communication system (for example, a 5G communication system) in case of supporting dual connectivity (DC) or carrier aggregation (CA). For example, through the method and apparatus for path configuration or path selection proposed in this disclosure, resource efficiency can be improved under the condition of meeting reliability requirements. Embodiments of the disclosure can be applied to a 5G (NR) communication system, in particular, a base station (e.g., gNB) in a 5G system. In addition, embodiments of the disclosure can be applied to a non-real-time RAN intelligent controller (non-RT RIC) and a near-real-time RAN intelligent controller (Near-RT RIC) in the open RAN (O-RAN) architecture. However, embodiments of the disclosure are not limited thereto, and embodiments of the disclosure can be applied to any suitable communication device.

According to some embodiments of the disclosure, when the UE may support multiple transmission paths for PDCP duplication, it is beneficial to consider when (or under what circumstances) to enable multi-path configuration (e.g., to determine that the UE is to be configured with multiple transmission paths).

According to some embodiments of the disclosure, it is beneficial to consider how to configure multiple transmission paths when the UE can support multiple transmission paths for PDCP duplication (or when it is determined that the UE is to be configured with multiple transmission paths for PDCP duplication transmission).

According to some embodiments of the disclosure, it is beneficial to consider how to activate PDCP duplication when the UE can support multiple transmission paths for PDCP duplication (or when it is determined that the UE is to be configured with multiple transmission paths for PDCP duplication transmission).

According to some embodiments of the disclosure, it is beneficial to consider how to select which paths to use for PDCP duplicated packet transmission, when the UE can support multiple transmission paths for PDCP duplication (or when it is determined that the UE is to be configured with multiple transmission paths for PDCP duplication transmission).

According to some embodiments of the disclosure, it is beneficial to consider how to (or under what circumstances) reconfigure paths.

According to some embodiments of the disclosure, it is beneficial to consider when (or under what circumstances) to disable the multi-path configuration (e.g., not to adopt the multi-path configuration and perform transmission only through a single path).

To at least solve one or more of the above problems, according to some embodiments of the disclosure, a grouping-based multi-path configuration method is proposed.

To at least solve one or more of the above problems, according to some embodiments of the disclosure, an Artificial Intelligence (AI)-assisted path selection method is proposed.

To at least solve one or more of the above problems, according to some embodiments of the disclosure, a multi-path configuration enabling method based on QoS and path state is proposed.

To at least solve one or more of the above problems, according to some embodiments of the disclosure, a dynamic path state reporting method is proposed.

Figure 6A:
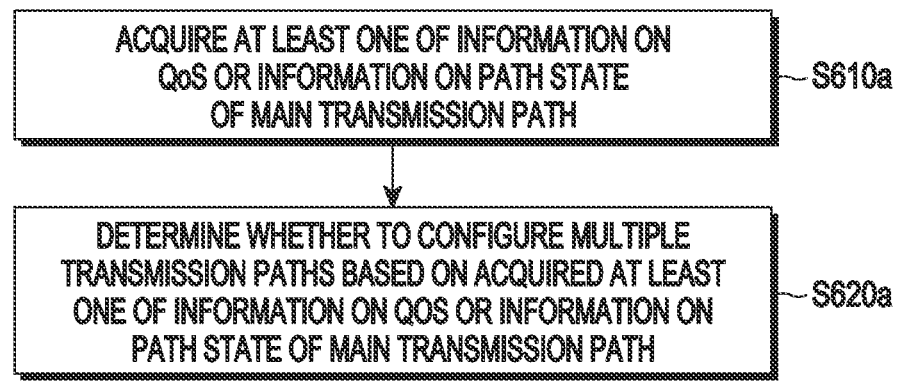
FIG. 6A illustrates a flowchart of a method of multi-path configuration enabling according to an embodiment of the disclosure.

FIG. 6A shows a flowchart of a method of multi-path configuration enabling according to an embodiment of the disclosure.

The embodiment described in connection with FIG. 6A can be used for determining by a node (e.g., a base station) that multiple paths are to be configured for part of some UEs served by the node (e.g., the base station) to ensure that QoS requirements are met; for example, these UEs may have the capability of supporting DC. Particularly, in an embodiment of the disclosure, when a single UE is configured with only a single path (for example, when the UE is not in DC), the single path is a main transmission path. A node (e.g., a base station) may determine whether the UE needs to be configured with multiple paths based on QoS parameter(s) (e.g., parameters related to QoS requirements) or the path state of the main transmission path. A node (e.g., a base station) can determine the trend of QoS parameter(s) through the path state of the main transmission path or the QoS parameter(s), and configure multiple paths for a UE that has a risk of not meeting the QoS requirements to ensure its communication performance, so that it can continuously meet the QoS requirements. An embodiment of a method for enabling multi-path configuration for one UE will be described below. For some UEs or all UEs served by the node (e.g., the base station), a same or similar method can be adopted to determine whether to enable multi-path configuration.

Referring to FIG. 6A, at operation S610a, a node (e.g., a base station) may acquire at least one of information on QoS (e.g., QoS parameter(s)) or information on the path state of the main transmission path (which may be referred to "path state information"). For example, a node (e.g., a base station) may acquire (e.g., collect) path state information of a main transmission path and QoS parameter(s) of an uplink or downlink PDCP transmission.

In some implementations, the path state information may include a Channel Quality Indicator (CQI) reported by the UE, or a Hybrid Automatic Repeat request (HARQ) failure rate or an HARQ retransmission rate determined (e.g., calculated) by a node (e.g., a base station). However, embodiments of the disclosure are not limited thereto, and the path state information may include other information on the path state.

In some implementations, the information on the QoS (e.g., QoS parameter(s) of PDCP transmission) may include the delay or packet loss rate related to the PDCP transmission determined (e.g., calculated) by the node. However, embodiments of the disclosure are not limited thereto, and the information on the QoS may include other information on QoS of the PDCP transmission.

At operation S620a, the node (e.g., the base station) may determine whether to configure multiple transmission paths based on the acquired at least one of the information on the QoS or the information on the path state of the main transmission path.

In some implementations, operation S620a may include: determining that multiple transmission paths are to be configured for the UE in response to the value indicated by the information on the QoS being smaller than or equal to a predetermined first threshold value and the evaluation value determined based on the information on the path state of the main transmission path being smaller than or equal to a predetermined second threshold value.

In some examples, operation S620a may include the following two substeps. In the first substep of operation S620a, a node (e.g., a base station) may compare the information on QoS (e.g., QoS parameter(s)) with a predetermined or predefined or preconfigured threshold value (e.g., an alert threshold value; in an embodiment of the disclosure, it may be referred to as a first threshold value). For example, the first threshold value may be greater than a value corresponding to the QoS requirements of the URLLC service, so as to determine the trend of the QoS parameter(s) to avoid that the QoS parameter(s) cannot meet the requirements. If the value indicated by the information on the QoS (e.g., the values of the QoS parameter(s)) is smaller than (or equal to) the first threshold value determined or predefined or preconfigured, then subsequently the evaluation value determined by the information on the path state of the main transmission path (e.g., the path state parameter of the main transmission path) is compared with a second threshold value determined or predefined or preconfigured, as described in the second sub-step of operation S620a. If the value indicated by the information on the QoS (for example, the values of the QoS parameter(s)) is not smaller than (or not equal to) the first threshold value, it is determined not to configure multiple transmission paths for the UE and maintain the existing single-path configuration. In the second substep of operation S620a, a node (e.g., a base station) may calculate the evaluation value of the path state of the main transmission path and compare it with the second threshold value. If the evaluation value of the path state of the main transmission path is smaller than (or equal to) the second threshold value, the node (e.g., the base station) may determine to enable multi-path configuration for the UE (e.g., determine to configure multiple transmission paths for the UE). In this case, the UE can be referred to as "a UE that needs to be configured with multiple paths". If the evaluation value of the path state of the main transmission path is not smaller than (or not equal to) the second threshold value, it is determined that the UE is not configured with multiple transmission paths and the existing single-path configuration is maintained.

In some implementations, the evaluation value of the path state of the transmission path (e.g., the main transmission path) can be determined by Equation 1.

$$PS\_E = V\_CQI * (1 - R1\_HARQ) * 2^{(2-R2\_HARQ)} \quad \text{Equation 1}$$

In Equation 1, PS_E indicates the evaluation value, V_CQI indicates the value indicated by the CQI (of the transmission path, for example), R1_HARQ indicates the HARQ failure rate (of the transmission path, for example), and R2_HARQ indicates the HARQ retransmission rate (of the transmission path, for example).

In some implementations, the second threshold value is an evaluation value of a single path state that ensures that the QoS of the PDCP transmission can meet the QoS requirements.

Example methods of multi-path configuration enabling according to some embodiments of the disclosure have been described above. With these methods, when the UE can support multiple transmission paths for PDCP duplication, it can be determined when (or under what circumstances) to enable multi-path configuration (for example, it is determined that the UE is to be configured with multiple transmission paths). By configuring multiple paths for a UE that has the risk of not meeting the QoS requirements to ensure its communication performance, it can continuously meet the QoS requirements.

Figure 6B:
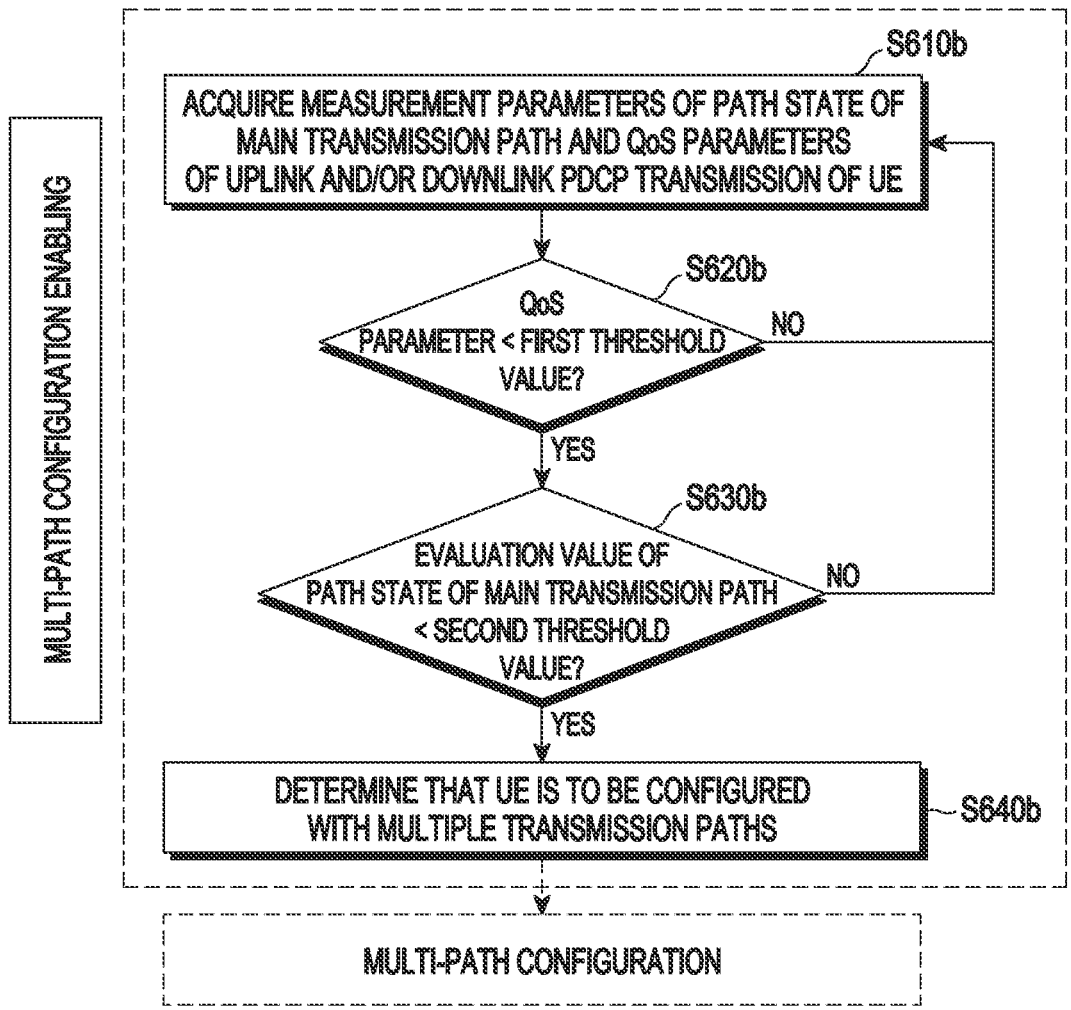
FIG. 6B illustrates a flowchart of a method of multi-path configuration enabling according to an embodiment of the disclosure.

FIG. 6B shows a flowchart of a method of multi-path configuration enabling according to an embodiment of the disclosure. For example, the method shown in FIG. 6B may be based on the method shown in FIG. 6A. The description provided above in connection with FIG. 6A can also be applied to this example embodiment.

Some embodiments described in connection with FIG. 6B are multi-path configuration enabling procedures. These embodiments are used to determine whether to configure multiple transmission paths for a UE in a single connection by a node (e.g., a base station). Before this determination is made, a single path between a UE and a node (e.g., a base station) is a main transmission path. A node (e.g., a base station) can predict the trend of QoS parameter(s) according to the path state of the main transmission path and QoS parameter(s), and configure multiple transmission paths for a UE that has the risk of not meeting the QoS requirements to ensure its communication performance, so that it can continuously meet the QoS requirements.

Referring to FIG. 6B, at operation S610b, a node (e.g., a base station) acquires the measurement parameters of the path state of the main transmission path and the QoS parameter(s) of the uplink or downlink PDCP transmission of the UE. The measurement parameters of the path state of the main transmission path may include one or more of a CQI, an HARQ failure rate, or an HARQ retransmission rate. The QoS parameter(s) of the uplink or downlink PDCP transmission may include one or more of a delay related to the PDCP transmission, or a packet loss rate, etc.

At operation S620b, a node (e.g., a base station) compares the QoS parameter(s) with the first threshold value to determine whether the QoS parameter(s) is smaller than (or equal to) the first threshold value. If the QoS parameter(s) is smaller than (or equal to) the first threshold value, step S630b is performed; If the QoS parameter(s) is not smaller than (or not equal to) the first threshold value, the single-path connection is maintained, and the process returns to operation S610 to re-evaluate after a predetermined period of time. To avoid not meeting the QoS requirements, the first threshold value may be greater than QoS requirements to detect the trend of the QoS parameter(s).

At operation S630b, a node (e.g., a base station) may compare the evaluation value of the path state of the transmission path with a second threshold value to determine whether the evaluation value of the path state of the main transmission path is smaller than (or equal to) the second threshold value. If the evaluation value of the path state of the main transmission path is smaller than (or equal to) the second threshold value, operation S640b is performed. If the evaluation value of the path state of the main transmission path is not smaller than (or not equal to) the second threshold value, the process returns to operation S610b.

At operation S640b, it is determined that the UE is to be configured with multiple transmission paths. The UE may be referred to a UE that needs to be configured with multiple paths. Upon determining that the UE is to be configured with multiple transmission paths, the UE may be configured with multiple paths, as will be described in detail later.

Example methods of multi-path configuration enabling according to some embodiments of the disclosure have been described above. With these methods, when the UE can support multiple transmission paths for PDCP duplication, it can be determined when (or under what circumstances) to enable multi-path configuration (for example, determining that the UE is to be configured with multiple transmission paths). By configuring multiple paths for a UE that has the risk of not meeting the QoS requirements, its communication performance can be ensured, so that it can continuously meet the QoS requirements.

Figure 7A:
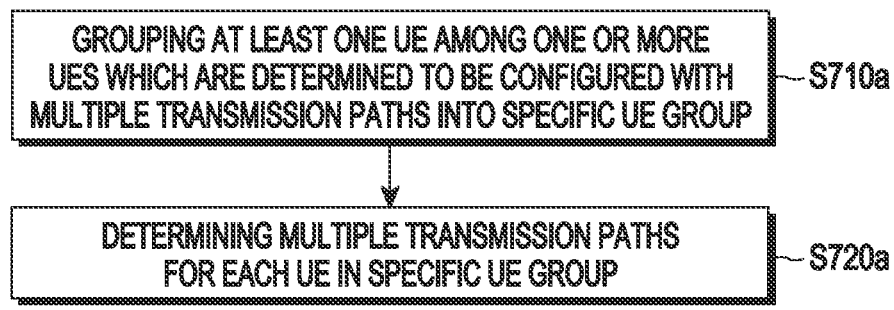
FIG. 7A shows a flowchart of a multi-path configuration method according to an embodiment of the disclosure.

FIG. 7A shows a flowchart of a multi-path configuration method according to an embodiment of the disclosure.

Referring to FIG. 7A, it may perform path configuration for a UE that needs to be configured with multiple paths (for example, determined by the embodiments described in connection with FIG. 6A or 6B). For example, the configured path is the available path of the UE. These embodiments can solve one or more of the following problems: how many paths need to be configured for the UE, whether the assisting node needs to be connected, which node to be selected as the assisting node, and which paths to be configured to the hosting node or the assisting node. According to the embodiments of the disclosure, by performing path configuration on the UE based on grouping, the computation amount and complexity required for the path configuration can be greatly reduced. For example, the multi-path configuration method according to some embodiments of the disclosure can be divided into two sub-processes: grouping the UEs that need to be configured with multiple paths, and performing the path configuration based on the grouping (for example, for the UEs grouped into a specific UE group).

Referring to FIG. 7A, at operation S710a, at least one UE among one or more UEs determined to be configured with multiple transmission paths is grouped into a specific UE group. For example, the one or more UEs may be UEs served by a node (e.g., a base station). When it is determined that the one or more UEs are configured with multiple transmission paths, the node (e.g., the base station) may be a hosting node.

In some implementations, at least one UE among the one or more UEs is grouped into a specific UE group based on at least one of a path state of a main transmission path, a measurement report, a geographical location or a service type of each UE among the one or more UEs. For example, UEs with the similar path state of the main transmission path and the measurement report, or the same service type, or the similar geographical location can be grouped into the specific groups.

In some examples, grouping at least one UE among the one or more UEs into a specific UE group based on at least one of the path state of the main transmission path, the measurement report, the geographic location or the service type of each UE of the one or more UEs may include: grouping UEs into a first UE group based on the path state of the main transmission path and the service type of each UE among the one or more UEs (which can be referred to as "a first-stage grouping"); selecting candidate transmission paths for the UE based on the measurement report of each UE in the first UE group (for example, the transmission path may be a certain cell on a certain node); grouping the UEs with same candidate transmission paths in the first UE group into a first UE subgroup as a specific UE group (which can be referred to "a second-stage grouping"). For example, the operation S710a for grouping the UEs may include the following first to fourth substeps.

In the first substep of operation S710a, UEs with the similar path state of the main transmission path and the same service type are grouped into a corresponding UE group (i.e., the first-stage grouping). For example, the path state of the main transmission path can be divided into N levels according to the evaluation value of the path state of the main transmission path, where N is a positive integer; for example, evaluation value 0 to 10 are the first level, evaluation value 11 to 20 are the second level, and evaluation value 21 to 30 are the third level, and so on. If the evaluation values of the path states of the main transmission paths are at the same level, it can be considered that the path states of the main transmission paths are similar Since there may be multiple groups of UEs with evaluation values of different levels, the one or more UEs may be grouped into multiple different groups. Each of multiple groups may include at least one UE, wherein the UEs in each group have similar path states of the transmission paths and the same service types, and multi-path configuration (e.g., multiple transmission paths) may be determined for each group respectively. In the following description, for the sake of brevity, multiple transmission paths will be determined for a certain group of UEs (referred to as "a first UE group" in an embodiment of the disclosure) among the plurality of groups of UEs. However, those skilled in the art can understand that the multi-path configuration can be determined for each group of UEs in multiple groups of UEs by adopting a method as same as or similar to the methods in the following embodiments.

In some implementations, the service type may include mMTC, URLLC or eMBB.

In the second substep of operation S710a, candidate transmission paths are selected for each UE in the first UE group, wherein the candidate transmission path is a path with better signal quality (for example, higher than a predetermined third threshold value) determined based on the measurement report. The measurement report may include at least one of the following: a Reference Signal Receiving Power (RSRP), a Reference Signal Receiving Quality (RSRQ), or a Signal to Interference plus Noise Ratio (SINR).

In the third substep of operation S710a, UEs with same candidate transmission paths in the first UE group are grouped into the first UE subgroup. UEs in the first UE subgroup have the same candidate transmission paths. In some embodiments of the disclosure, there may be multiple first UE subgroups. For the sake of brevity, multiple transmission paths will be determined for a certain UE subgroup among multiple first UE subgroups. However, those skilled in the art can understand that the multi-path configuration can be determined for each of multiple first UE subgroups by adopting a method as same as or similar to the methods in the following embodiments.

In the fourth substep of operation S710a, one or more UEs geographically far from other UEs (e.g., a UE whose distance from other UEs (e.g., one or more reference UEs) in the first UE subgroup is greater than a preset threshold value) are removed from the first UE subgroup, and the first UE subgroup after removing the one or more UEs is taken as the final specific UE group.

In some implementations, if the UE can join a certain existing specific UE group based on the above various conditions, the UE can directly join the certain existing specific UE group.

In some implementations, grouping decisions can be generated based on AI models. For example, operation S710a may include: grouping the UEs among the one or more UEs into a specific UE group by using a first artificial intelligence (AI) model. The first artificial intelligence model may be trained to output information on the specific UE group based on at least one of a path state of a main transmission path, a measurement report, a geographical location, or a service type of each of the one or more UEs as an input.

In some examples, the input of the first AI model may include the location of the UE, the service type, the measurement report (including the RSRP, RSRQ, or SINR), and the path state of the main transmission path, and the output of the model may be a group category (or a group identification (ID)) and group members of each group. The first AI model can be deployed in the HN or other nodes, such as a near-real-time RAN intelligent controller (Near-RT RIC). The nodes can input parameters (such as the location of the UE, the service type, the measurement report, and the path state of the main transmission path, etc.) into the first AI model and get a corresponding grouping arrangement.

With continued reference to FIG. 7A, at operation S720a, multiple transmission paths for each UE in a specific UE group are determined.

Operation S720a includes configuring multiple transmission paths for each of the one or more specific UE groups based on the one or more specific UE groups formed at operation S710a. Path configuration for UEs in each specific UE group is the same.

In some implementations, determining the multiple transmission paths for each UE in a specific UE group includes: repeatedly performing an operation of selecting a transmission path with the highest signal quality that has not been selected from among candidate transmission paths of the UE until a preset condition is satisfied; and determining the selected one or more transmission paths as the multiple transmission paths for each UE in the specific UE group, and wherein the main transmission path is determined as a primary path. For example, the preset conditions may include at least one of the following: a sum of signal qualities of the selected one or more transmission paths being greater than a predetermined fourth threshold, or the number of the selected one or more transmission paths reaching a predetermined fifth threshold, wherein the signal qualities may be determined based on a measurement report, and the measurement report may include at least one of the RSRP, RSRQ, or SINR.

In some implementations, when the selected transmission path is not in the HN and the AN has not been determined, it is determined that the node where the transmission path is located is the AN.

In some implementations, if the AN has been determined, when selecting the transmission path with the highest signal quality that has not been selected from the candidate transmission paths of UE, the selection is only made from the transmission path related to the HN and the transmission path related to the determined AN; or if the AN has not been determined, when selecting the transmission path with the highest signal quality which has not been selected from the candidate transmission paths of the UE, the selection is made from the transmission path related to the HN and the transmission path related to other nodes.

In some implementations, when performing path configuration through operation S720a, the path configuration criterion may be to select transmission paths in the candidate transmission paths in a descending order based on measurement reports (including the RSRP, RSRQ, or SINR determined from the measurement reports), but is limited by the following conditions: a total signal quality (for example, a total signal strength) of the selected transmission paths being higher than a fourth threshold value; or the maximum number of the selected transmission paths reaching a fifth threshold value (for example, 4); or the maximum number of the selected nodes reaching a predetermined threshold value (for example, 2). In some examples, operation S720a may include the first to fifth substeps described below.

In the first substep of operation S720a, a transmission path with the best signal quality (for example, the highest signal strength) is selected among the candidate transmission paths within a specific UE group. If the AN has been determined, the selected transmission path should be limited to the path in the HN and the path in the AN. If the AN has not been determined, a transmission path can be selected from the path in the HN and paths in other nodes.

In the second substep of operation S720a, if the selected transmission path is not in itself (for example, the selected transmission path is not in the HN), it is determined that the node where the transmission path is located is the AN. Through the second substep, one AN can be determined.

In the third substep of operation S720a, it is determined (e.g., decided) whether more transmission paths need to be configured based on a deciding condition. The deciding condition may include that a sum of the signal qualities of the selected transmission paths reaches or exceeds a threshold value or the total number of the selected transmission paths reaches 4, wherein the signal qualities may be determined based on a measurement report, and the measurement report may include at least one of the RSRP, RSRQ or SINR. If the deciding condition is not satisfied, it is determined that more transmission paths need to be configured, and the process returns to the first substep to continue to configure paths. If the deciding condition is satisfied, it is determined that the selection of the transmission paths has been completed, and the process proceeds to the fourth substep of operation S720a. By executing the first sub-step to the third sub-step of operation S720a in loop, multiple transmission paths can be selected for the specific UE group.

In the fourth substep of operation S720a, the selected transmission path is taken as the path configuration of the specific UE group, and the main transmission path is determined as the primary path.

In the fifth substep of operation S720a, the HN and the AN are connected based on the path configuration. Through the above path selection process, as there is a transmission path on the assisting node, it is necessary to connect the HN and the AN.

In some implementations, under the existing configuration path, when the QoS (e.g., the value indicated by information on QoS) is poor for a continuous period of time (e.g., a predetermined number of time slots or sub-time slots or mini-time slots), the path configuration is re-performed. For example, when the QoS value is smaller than (or equal to) a predetermined sixth threshold value for a continuous period of time, the path configuration can be re-performed, so that it can be decided in advance whether the QoS has a trend of not meeting the QoS requirements. For example, the threshold value may be greater than a value corresponding to the QoS requirements of the PDCP transmission.

In some implementations, the path configuration decision (which may correspond to the first configuration information) may be generated by using the second AI model. For example, determining multiple transmission paths for each UE in a specific UE group at operation S720a may include: determining multiple transmission paths for each UE in the specific UE group by using the second AI model. The second AI model may be trained to output configuration information (referred to as first configuration information in an embodiment of the disclosure) on multiple transmission paths for a specific UE group based on at least one of a path state of a main transmission path, a measurement report, a geographic location or a service type of each UE in the specific UE group as an input or based on at least one of service types and an average measurement report in the specific UE group as an input. The first configuration information may include one or more of identification information of the assisting node, identification information of a transmission path related to the hosting node among the selected one or more transmission paths, or identification information of a transmission path related to the assisting node among the selected one or more transmission paths.

In some examples, the input of the second AI model may include the service type, the measurement report (including the RSRP, RSRQ, or SINR), the path state of main transmission path of each UE in the specific UE group, or the service types and the average measurement report (including the RSRP, RSRQ, or SINR) in the specific UE group. The output of the model may be a path configuration decision, which may include, for example, an identification of the AN, an identification of a transmission path in the HN (e.g., a cell identification), and an identification of a transmission path in AN (e.g., cell identification). However, embodiments of the disclosure are not limited thereto, and the path configuration decision may include other information on the one or more configured transmission paths. For example, the second AI model can be deployed in the HN or other nodes, such as a near-real time RAN intelligent controller (Near-RT RIC). A node (e.g., a base station) may generate a path configuration decision for each specific UE group by using the second AI model according to the grouping result determined at operation S710a, and then connect with the corresponding AN for subsequent path selection and transmission. This scheme can provide more accurate path configuration.

In some implementations, multi-path configuration can be performed by using a third AI model. For example, multiple transmission paths for UEs classified into a specific UE group among one or more UEs may be determined by the third AI model, wherein the one or more UEs are determined to be configured with multiple transmission paths (for example, determined by embodiments described in connection with FIG. 6A or 6B). A third AI model is trained to output first configuration information based on at least one of a path state of a main transmission path, a measurement report, a geographical location or a service type of each of the one or more UEs as an input. The first configuration information may include one or more of identification information of the assisting node, identification information of the transmission path related to the hosting node among the selected one or more transmission paths, or identification information of the transmission path related to the assisting node among the selected one or more transmission paths.

In some examples, a path configuration decision may be directly generated for a UE that needs to be configured with multiple paths (e.g., determined by embodiments described in connection with FIG. 6A or 6B) by utilizing the third AI model. The input of the third AI model may be the locations, service types, measurement reports (including the RSRPs, RSRQs, or SINRs), and the path states of the main transmission paths of one or more UEs that need to be configured with multiple paths. The output of the third AI model may be a path configuration decision, including, for example, an identification of the AN, a path identification of the HN (such as a cell identification), or a path identification of the AN (such as a cell identification). However, embodiments of the disclosure are not limited thereto, and the path configuration decision may include other information on the one or more configured transmission paths. A third AI model can be deployed in the HN or other nodes, such as a near-real-time RAN intelligent controller (Near-RT RIC). A node (e.g., a base station) can generate a path configuration decision by using the third AI model based on the information of the UE that needs to be configured with multiple paths, the path state of the main transmission path and the measurement report, and then connect to the corresponding AN for subsequent path selection and transmission. This scheme can provide more accurate path configuration.

Example methods of multi-path configuration according to some embodiments of the disclosure have been described above. Through multi-path configuration performed on a specific UE group after grouping the UEs that need to be configured with multiple paths, the complexity and computation amount of configuring the multiple paths are reduced and the system performance is improved.

Figure 7B:
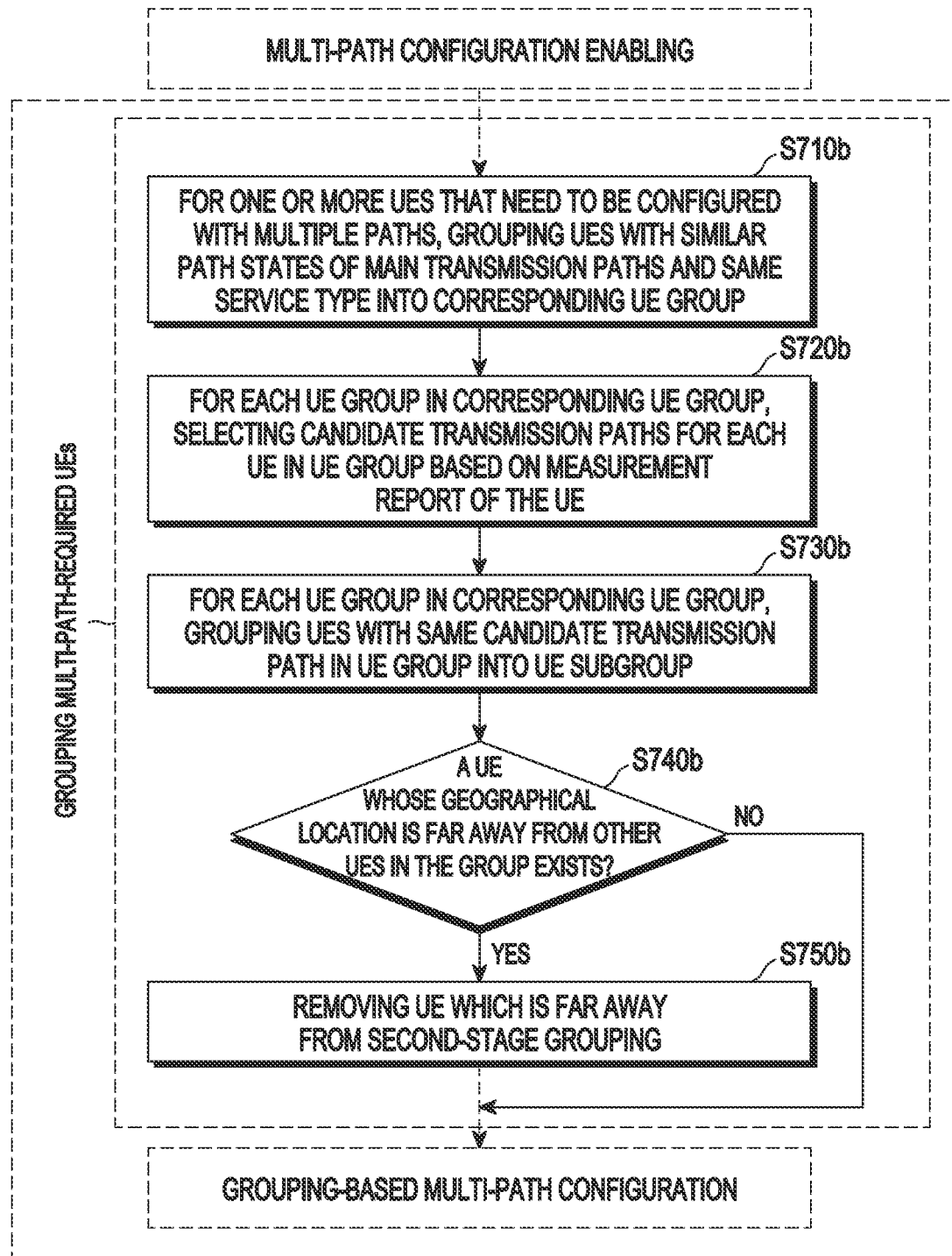
FIG. 7B shows a flowchart of a method for grouping UEs that need to be configured with multi-path according to an embodiment of the disclosure.

FIG. 7B shows a flowchart of a method for grouping UEs that need to be configured with multiple paths according to an embodiment of the disclosure. For example, the method shown in FIG. 7B may be based on the method shown in FIG. 7A, such as operation S710a. The description provided above in connection with FIG. 7A can also be applied to this example embodiment. For example, according to the embodiment described in connection with FIG. 7B, the UEs that need to be configured with multiple paths are grouped to acquire multiple specific UE groups, and then, according to the embodiment described in connection with FIG. 7E, multiple transmission paths are configured for each of the multiple specific UE groups.

Referring to FIG. 7B, at operation S710b, for one or more UEs that need to be configured with multiple paths, UEs with similar path states of main transmission paths and same service types are grouped into corresponding UE groups (to acquire one or more first-stage groups).

Then, at operation S720b, for each UE group in the corresponding UE groups, candidate transmission paths are selected for each UE in the UE group based on the measurement report (or the signal quality determined based on the measurement report) of the UE. The measurement report may include at least one of the RSRP, RSRQ, or SINR, for example. For example, when the signal quality determined by the measurement report of the corresponding transmission path is greater than the predetermined third threshold value, the transmission path is selected as a candidate transmission path.

Then, at operation S730b, for each UE group in the corresponding UE groups, the UEs with same candidate transmission paths in the UE group are grouped into UE subgroups (to acquire one or more second-stage groups).

Then, at operation S740b, for each second-stage group, it is decided whether there is a UE whose geographical location is far away from other UEs in the group (for example, a UE whose distance from other UEs (for example, one or more reference UEs) in the second-stage group is greater than a preset threshold value). If there is a UE whose geographical location is far away from other UEs in the group, then at operation S750b, the UE is moved out from the second-stage group.

The second-stage groups may be the final grouping result, which provides one or more specific UE groups to be configured with multiple paths for subsequent path configuration. In the subsequent path configuration process, the configuration can be based on the category of each group in multiple groups, wherein the configuration results of the UEs in each group are the same.

Figure 7C:
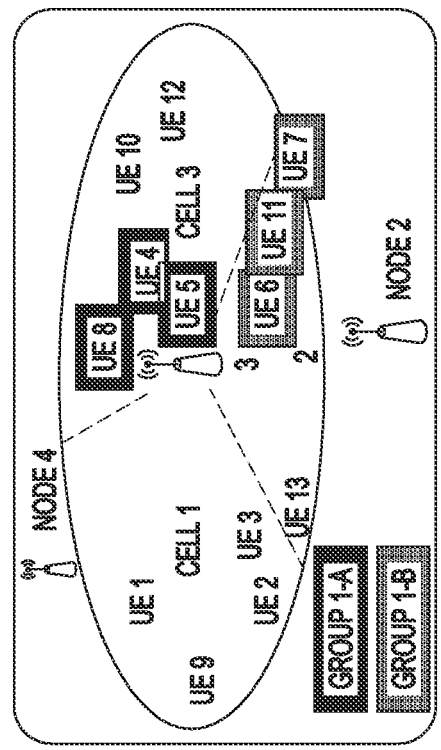
FIG. 7C shows a schematic diagram of a method for grouping UEs that need to be configured with multi-path according to an embodiment of the disclosure.
Figure 7C:
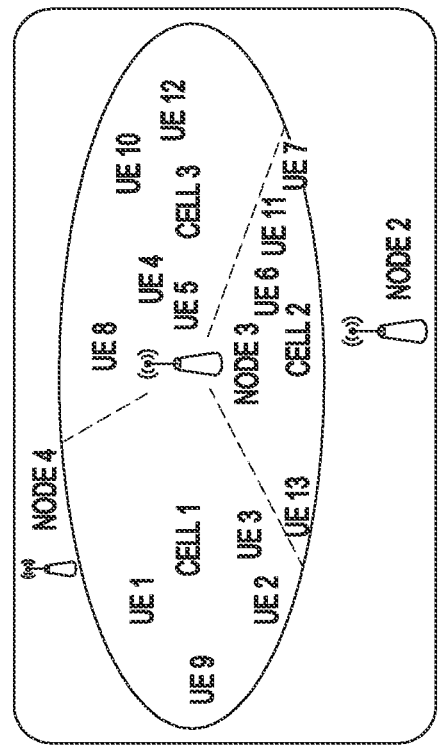

FIGS. 7C and 7D show specific examples of applying the method of grouping UEs that need to be configured with multi-path according to various embodiments of the disclosure. For example, the method described in connection with FIGS. 7C and 7D may be based on embodiments of FIG. 7A or 7B. It should be noted that the grouping method described in connection with FIGS. 7C and 7D is only an example, and embodiments of the disclosure are not limited to the scenarios shown in FIGS. 7C and 7D.

Referring to FIG. 7C, there are UEs (UE1~UE13) that need to be configured with multiple paths and related nodes (node 1, node 2 and node 3). UE1, UE2, UE3 and UE9 are located in cell 1, UE6, UE7, UE11 and UE13 are located in cell 2, and UE4, UE5, UE8, UE10 and UE12 are located in cell 3.

Referring to FIG. 7D, in the first-stage grouping process, UEs with similar path states of main transmission paths and the same service types are grouped into corresponding UE groups. Particularly, UE4, UE5, UE8, UE6, UE13, UE7, UE2 and UE11 are grouped into a UE group with a group ID of 1; UE3 and UE1 are grouped into a UE group with a group ID of 2; UE10, UE12 and UE9 are grouped into a UE group with a group ID of 3.

With continued reference to FIG. 7D, then, in the second-stage grouping process, for each UE group in the corresponding UE groups, each UE is grouped into a corresponding UE subgroup based on the measurement report (the second-stage grouping). For example, for a UE group with a group ID of 1, UE4, UE5 and UE8 are grouped into a UE subgroup with a group ID of 1-A; UE6, UE13, UE7 and UE11 are grouped into a UE subgroup with a group ID of 1-B; and UE2 is grouped into a UE subgroup with a group ID of 1-C. For UEs with other group IDs, processing may be performed in a similar way.

With continued reference to FIGS. 7C and 7D, then, for each second-stage group, it is decided whether there is a UE whose geographical location is far away from other UEs in the group (for example, a UE whose distance from other UEs (for example, one or more reference UEs) in the second-stage group is greater than a preset threshold value). For example, for a UE subgroup with a group ID of 1-B, the UE13 is removed from the UE subgroup because the UE13 is far away from other UEs in the UE subgroup (for example, the distance from a reference UE (for example, one of UE6, UE11 or UE7) is greater than a preset threshold value). For UE subgroups with other group IDs, similar methods can be used for processing. Therefore, the final grouping result (which can be referred to a specific UE group) can be acquired.

The result provides one or more specific UE groups to be configured with multiple paths for subsequent path configuration. In the subsequent path configuration process, the configuration can be based on the category of each group in multiple groups, wherein the configuration results of the UEs in each group are the same.

Figure 7E:
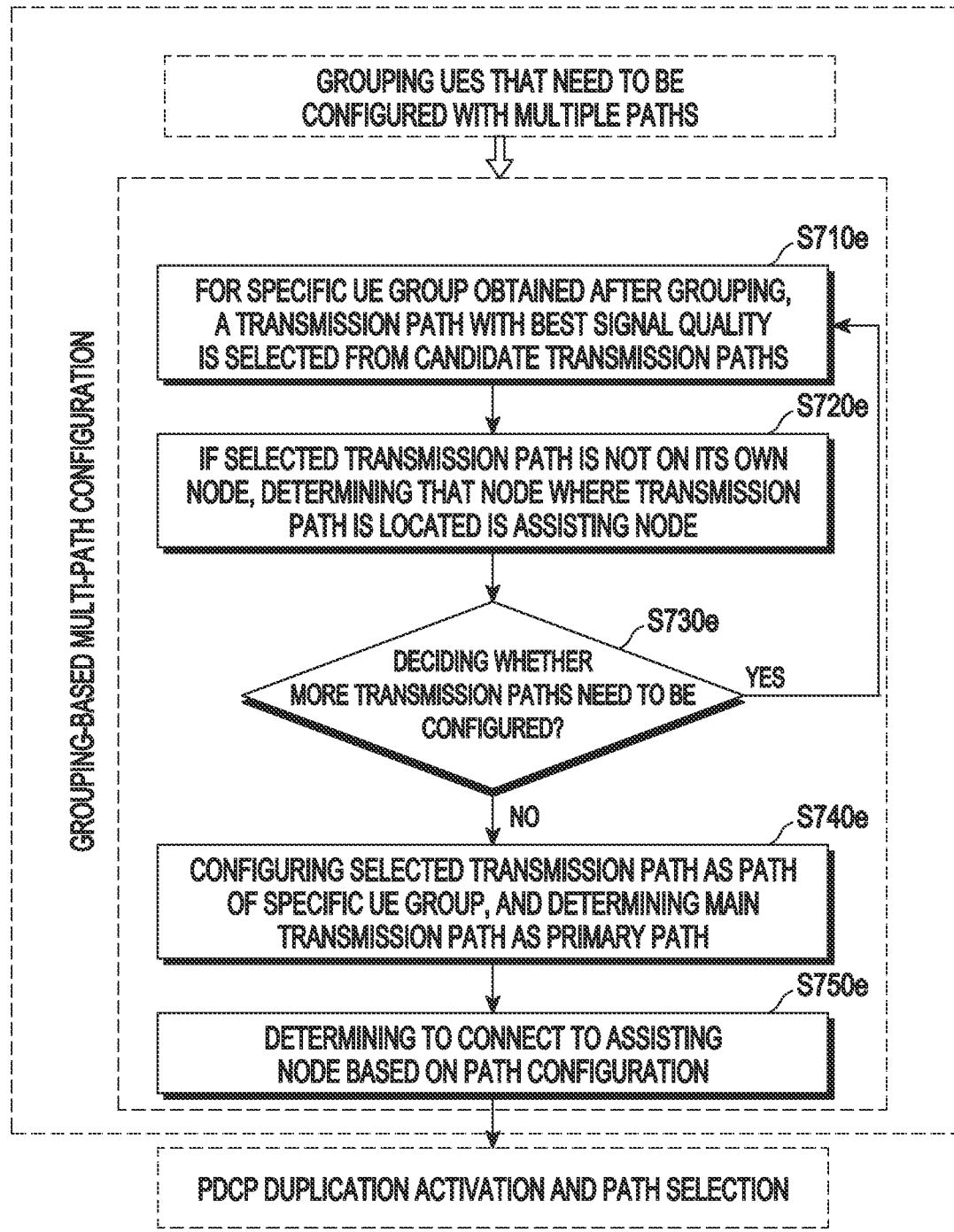
FIG. 7E illustrates a flowchart of a method of configuring multiple transmission paths for each of one or more specific UE groups according to an embodiment of the disclosure.

FIG. 7E shows a flowchart of a method for configuring multiple transmission paths for each of one or more specific UE groups according to an embodiment of the disclosure, wherein the one or more specific UE groups may be acquired by grouping the UEs that need to be configured with multiple paths using the method described in connection with FIG. 7A or 7B. The description provided above in connection with FIG. 7A or FIG. 7B can also be applied to this example embodiment. For example, the method shown in FIG. 7E may be based on the method shown in FIG. 7A, such as operation S720a. The embodiment described in connection with FIG. 7E may be a process of grouping-based multi-path configuration in multi-path configuration. Multi-path configuration is performed for each specific UE group based on the grouping result after grouping one or more UEs which need to be configured with multiple paths, wherein the path configuration of the UEs in each specific UE group is the same, thus greatly reducing the computation amount and complexity required for path configuration for multiple UEs.

Referring to FIG. 7E, at operation S710e, for a specific UE group, a transmission path with the best signal quality is selected from the candidate transmission paths. If the assisting node has been determined, the selected transmission path is limited to the transmission paths on the hosting node and the assisting node.

Then, at operation S720e, if the selected transmission path is not on its own node (for example, the selected transmission path is not in the HN), it is determined that the node where the transmission path is located is the AN. At operation S720e, one AN can be determined.

Next, at operation S730e, it is decided whether more transmission paths need to be configured based on the deciding conditions. The deciding conditions may include that the sum of the signal qualities of the selected transmission paths reaches or exceeds a threshold value or the total number of the selected transmission paths reaches a predetermined number (for example, 4), wherein the signal qualities may include at least one of the RSRP, RSRQ, or SINR. If the deciding conditions are not satisfied, it is determined that more transmission paths need to be configured, and the process returns to the first substep to continue to configure paths. If the deciding conditions are satisfied, it is determined that the selection of the transmission paths has been completed, and the process proceeds to operation S740e. By executing operations S710e to S730e in loop, multiple transmission paths can be selected for the specific UE group.

Then, at operation S740e, the selected transmission path is taken as the path configuration of the specific UE group, and the main transmission path is determined as the primary path.

Next, at operation S750e, the corresponding assisting node is connected based on the path configuration.

Example methods of multi-path configuration according to some embodiments of the disclosure are described above in connection with FIGS. 7B-7E. By performing multi-path configuration on a specific UE group after grouping the UEs that need to be configured with multiple paths, the complexity and computation of configuring multiple paths are reduced and the system performance is improved.

Figure 8A:
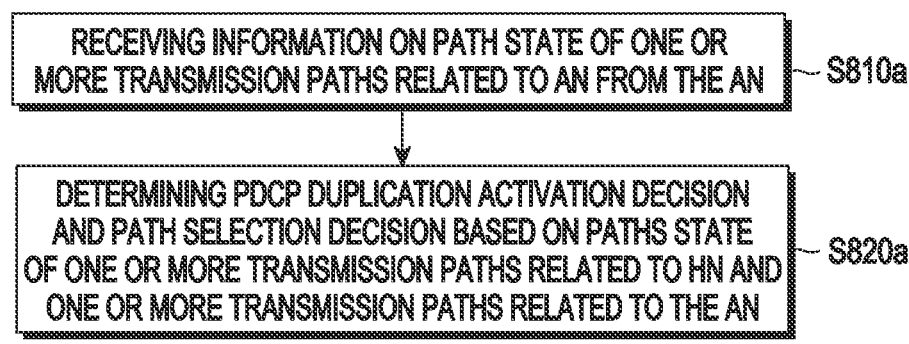
FIG. 8A shows a flowchart of a method of duplication mechanism activation and path selection according to an embodiment of the disclosure.

FIG. 8A shows a flowchart of a method of duplication mechanism activation and path selection according to an embodiment of the disclosure. For example, the duplication mechanism activation and path selection decision for a next moment can be determined based on a past or current path state (for example, by using an AI model), which can avoid packet loss to meet QoS requirements and effectively reduce a resource occupancy rate.

Referring to FIG. 8A, at operation S810a, information on path states of one or more transmission paths related to an AN is received from the AN.

In some implementations, the AN can report a path state of a transmission path on the AN to a HN. The AN may determine (e.g., decide) whether to report based on configuration of the HN. If the reporting cancellation conditions are satisfied, the reporting would be cancelled to reduce the reporting resource occupancy rate. For example, the reporting cancellation conditions may include that the path state keeps in a good state for a continuous period of time (for example, a predetermined number of time slots or sub-time slots or mini-time slots). If the AN cancels this report and the HN does not receive the path state report from the AN, the HN can use the last reported path state from the AN (for example, the latest path state).

In some implementations, for each transmission path among one or more transmission paths related to the assisting node, in response to an evaluation value determined based on information on the path state of the transmission path being greater than a seventh threshold value and the path state of the transmission path being maintained for at least a first predetermined time (for example, a predetermined number of time slots or sub-time slots or mini-time slots), the information on the path state of the transmission path is not transmitted by the assisting node.

At operation S820a, a PDCP duplication activation decision and a path selection decision are determined based on the path states of one or more transmission paths related to the HN and one or more transmission paths related to the AN. For example, the PDCP duplication activation decision (which may also be referred to as "information on whether to activate PDCP duplication" in an embodiment of the disclosure) may include whether to activate PDCP data packet duplication. For example, the path selection decision may include which transmission paths are selected for the transmission of the PDCP duplicated data packets (in an embodiment of the disclosure, it may also be referred to as "information on the selected transmission paths").

In some implementations, the path states of the one or more transmission paths related to the hosting node includes the path states of the one or more transmission paths related to the hosting node at the latest moment or the path states of the one or more transmission paths related to the hosting node at the current moment.

In some implementations, the path states of the one or more transmission paths related to the assisting node reported by the assisting node include the path states of the one or more transmission paths related to the assisting node at the latest moment or the path states of the one or more transmission paths related to the assisting node at the current moment.

In some implementations, when performing downlink transmission path selection, the HN may determine (e.g., decide) whether to enable the path selection process after acquiring (e.g., collecting) the path states of transmission paths to the AN and the HN. If the acquired path states are similar to the path states at the previous time point, the path selection is not enabled and the current path selection decision is used, to reduce the computation amount of path selection. For example, deciding whether the path states are similar may refer to embodiments described in connection with FIG. 7A.

In some implementations, if the path selection process is enabled, an AI model (which can be referred to "a fourth AI model" in embodiments of this disclosure) can be used to determine (e.g., predict) a PDCP duplication activation decision and a path selection decision (e.g., select part or all of the configured paths for transmission) for the next moment, so as to ensure that the QoS requirements are met and reduce resource occupancy. The fourth AI model may be an AI model trained based on a Deep Q-learning Network (DQN). However, embodiments of the disclosure are not limited thereto, and the fourth AI model may be any suitable AI model. The input of the fourth AI model includes, for example, a current path state of each transmission path, including, for example, a CQI, an HARQ failure rate, or an HARQ retransmission rate. The output of the fourth AI model may include, for example, a path selection decision for the next time, and the PDCP duplication activation decision may be determined based on the path selection decision. For example, if the number of transmission paths selected in the path selection decision is greater than one, the PDCP duplication activation decision is determined as activating PDCP duplication; if only one transmission path (for example, a primary path) is selected in the path selection decision, it is determined that the PDCP duplication activation decision is not activating PDCP duplication.

In some implementations, when PDCP duplication is activated, the HN generates PDCP duplicated packets and transmits the PDCP duplicated packets through the selected multiple transmission paths. For example, the same PDCP data packets are transmitted through each of the selected transmission paths.

Determining (e.g., predicting) the PDCP duplication activation decision and path selection decision for the next moment by using the fourth AI model may include training the fourth AI model and determining the PDCP duplication activation decision and path selection decision by applying the trained fourth AI model.

In some examples, the fourth AI model may be trained based on the DQN, for example, a reinforcement learning method may be used to train the fourth AI model. However, embodiments of the disclosure are not limited thereto, for example, training methods may include supervised learning, semi-supervised learning, unsupervised learning, and the like. In the training stage, the input of the fourth AI model may include a path state, a path selection, and QoS parameter(s).

The path state input may the path state of the current transmission path (e.g., the currently used transmission path). The collected raw path state may require data pre-processing. Data pre-processing methods may include, for example, normalization or partial normalization.

The path selection input may represent one or more selected transmission paths among the configured transmission paths. For example, multiple bits can be used to represent multiple configured transmission paths, and one bit in the multiple bits represents one transmission path; For example, if the bit is "1", it means that the transmission path is selected; if the bit is "0", the transmission path is not selected. If the DQN is used for model training, it is necessary to match the path selection with the action. For example, a method of binary and decimal conversion can be used for the matching. For example, the binary number "0001" indicates action 0 (or action 1), and the binary number "0010" indicates action 1 (or action 2).

The QoS parameter(s) input may represent the QoS parameter(s) obtained after applying path selection based on the current path state. The input may include the packet loss rate and the delay of the PDCP transmission. If the DQN is used for model training, the QoS parameter(s) need to be converted into rewards. The determination of the rewards may be based on the QoS parameter(s) and the number of the selected transmission paths. In one implementation, a rule can be adopted, wherein if the QoS parameter(s) (e.g., the packet loss rate) is greater than or equal to the threshold value, a predetermined method is used for a single reward conversion; if the QoS parameter(s) (e.g., the packet loss rate) is smaller than or equal to the threshold value, another predetermined method is used for the single reward conversion. The reward conversion method comprises one or more of the following methods:

$$R = \frac{a}{N_{PN}} + b + \frac{c}{D_{delay}}$$ Equation 2

$$R = \frac{d}{N_{PN} - e} - DR_{drop} * f + \frac{g}{D_{delay}}$$ Equation 3

$$R = -N_{FN} * h + i$$ Equation 4

$$R = j$$ Equation 5

$$R = -N_{PN} * k + l + \frac{m}{D_{delay}}$$ Equation 6

$$R = -N_{PN} * n - DR_{drop} * o + \frac{p}{D_{delay}}$$ Equation 7

In Equation 2 to Equation 7, R indicates the reward, $N_{PN}$ indicates the number of the selected transmission paths, $D_{delay}$ indicates the delay, $DR_{drop}$ indicates the packet loss rate, and, a, b, c, d, e, f, g, h, i, j, k, l, m, n, o, p indicate constants respectively.

In some implementations, after training the fourth AI model, the PDCP duplication activation decision and path selection decision can be determined by using the trained fourth AI model ("model inference stage").

In the model inference stage, the input of the fourth AI model may include the path state of each transmission path. If the path state needs to be pre-processed in the training stage, the same pre-processing method can be applied in the model inference stage. The output of the model inference stage may include a path selection decision, wherein the PDCP duplication activation decision may be determined based on the path selection decision. If the fourth AI model is completed by using DQN training, the output result of the fourth AI model can be Q values for different actions, and the action with the maximum Q value is selected, and the path selection is restored based on the path selection and action mapping policy and the related result is taken as the final selection result. If the number of the selected transmission paths is greater than the predetermined number (for example, 1), PDCP duplication is activated.

In some implementations, the fourth AI model may be deployed in the HN or other nodes, such as the Near-RT RIC.

In some implementations, when the path selection process is enabled, the fifth AI model can be used to predict the QoS (e.g., the delay, packet loss rate, etc.) of the downlink transmission path, so as to ensure that the QoS requirements are met and reduce resource occupancy. The fifth AI model may be trained to output the QoS of the downlink transmission path based on one or more path state parameters of the downlink transmission path as an input. The input of the fifth AI model includes a CQI, an HARQ failure rate, an HARQ retransmission rate, or other path state parameters. The pre-processing method of the input may be the same as or different from the one used by the AI model for downlink transmission path selection. The output of the fifth AI model is the predicted QoS of each downlink transmission path. The fifth AI model can be deployed in the HN or other nodes, such as the Near-RT RIC. After acquiring the QoS prediction result of the downlink transmission path, the HN performs the path selection based on the QoS prediction result to guarantee the QoS performance of downlink transmission.

In some implementations, when selecting uplink transmission paths, the sixth AI model can be used to make PDCP duplication activation decisions and path selection decisions (for example, selecting some or all of corresponding paths) related to the uplink transmission, so as to ensure that the QoS requirements are met and reduce the resource occupancy. The sixth AI model may be the same as or different from the fourth AI model. The input of the sixth AI model includes a Modulation and Coding Scheme (MCS), an HARQ failure rate, an HARQ retransmission rate, or other path state parameters of each transmission path. The pre-processing method of the input can be the same as or different from the one used by the AI model for downlink path selection. When the sixth AI model is used for uplink transmission path selection, the output of the sixth AI model is a predicted path selection decision for uplink transmission. The model can be deployed in the HN or other nodes, such as the Near-RT RIC. In some implementations, the UE may be informed that the path selection decision for uplink transmission generated at the node through Medium Access Control (MAC) Control Element (CE) or Radio Resource Control (RRC) signaling, and the UE may select the uplink transmission path according to the received path selection decision, to perform uplink transmission.

In some implementations, when the selection of the uplink transmission path is performed, the seventh AI model can be used to predict the QoS of the uplink transmission path (e.g., the delay, packet loss rate, etc.) to ensure that the QoS requirements are met and reduce resource occupancy. The seventh AI model may be the same as or different from the fifth AI model. The input of the seventh AI model may include a Modulation and Coding Scheme (MCS), an HARQ failure rate, an HARQ retransmission rate, or other path state parameters of each uplink transmission path. The pre-processing method of the input can be the same as or different from the one used by the model for downlink path selection. The output of the seventh AI model is the predicted QoS of each uplink transmission path. The seventh AI model may be deployed at the UE side or other nodes (e.g., base stations). When the seventh AI model is deployed at other nodes (e.g., base stations), the UE may acquire information on the QoS of the uplink transmission path from the base stations. For example, the information on the QoS of the uplink transmission path can be acquired via MAC CE or RRC signaling. When the seventh AI model is deployed at the UE, the UE can directly determine the QoS of the uplink transmission path. The UE can autonomously select the uplink transmission path for uplink transmission according to the QoS of the uplink transmission path under the limitation of the received MAC CE. This method reduces the computational burden of nodes.

Figure 8B:
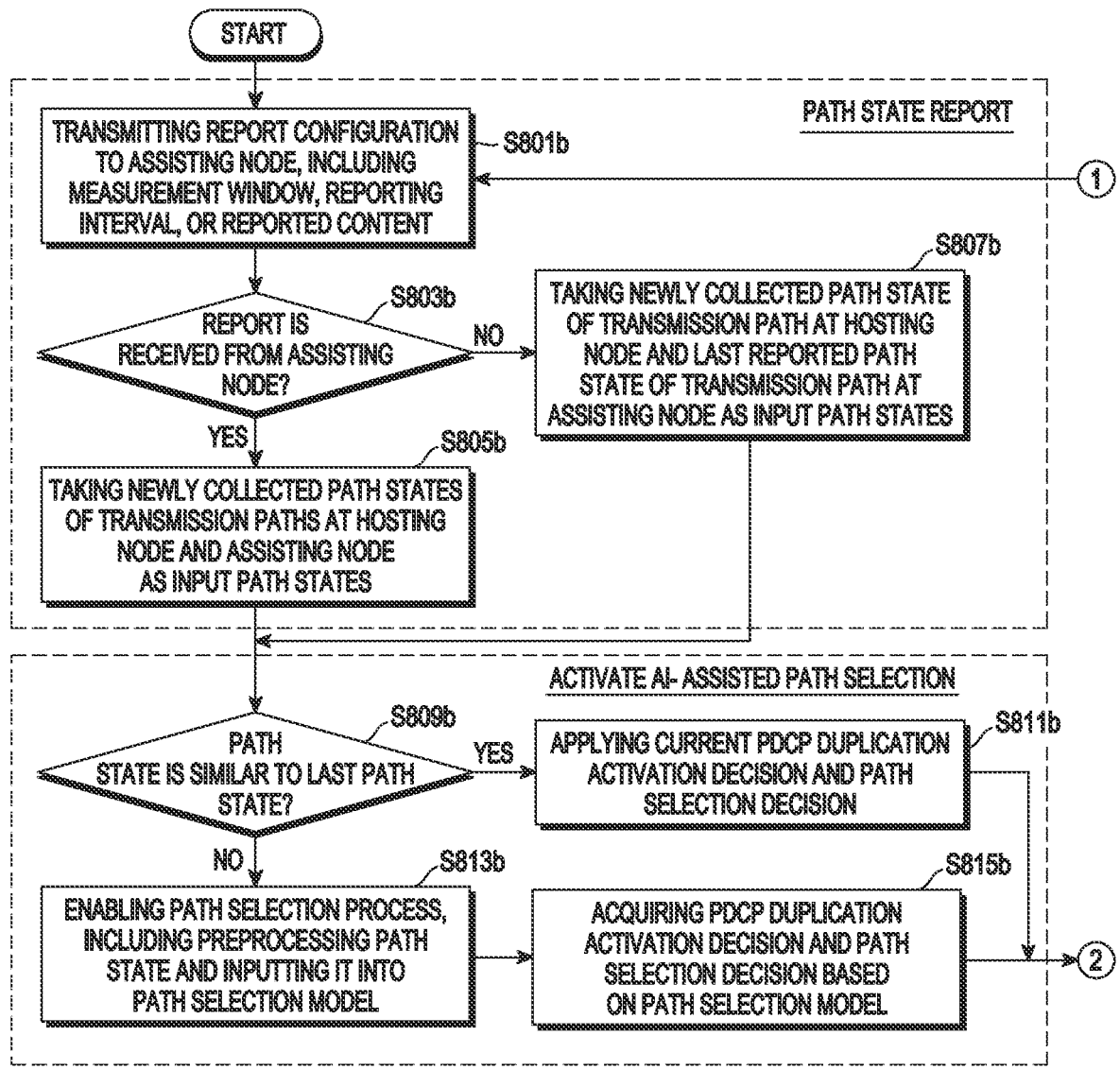
FIGS. 8B and 8C illustrate a flowchart of a method of duplication mechanism activation and path selection according to various embodiments of the disclosure.
Figure 8C:
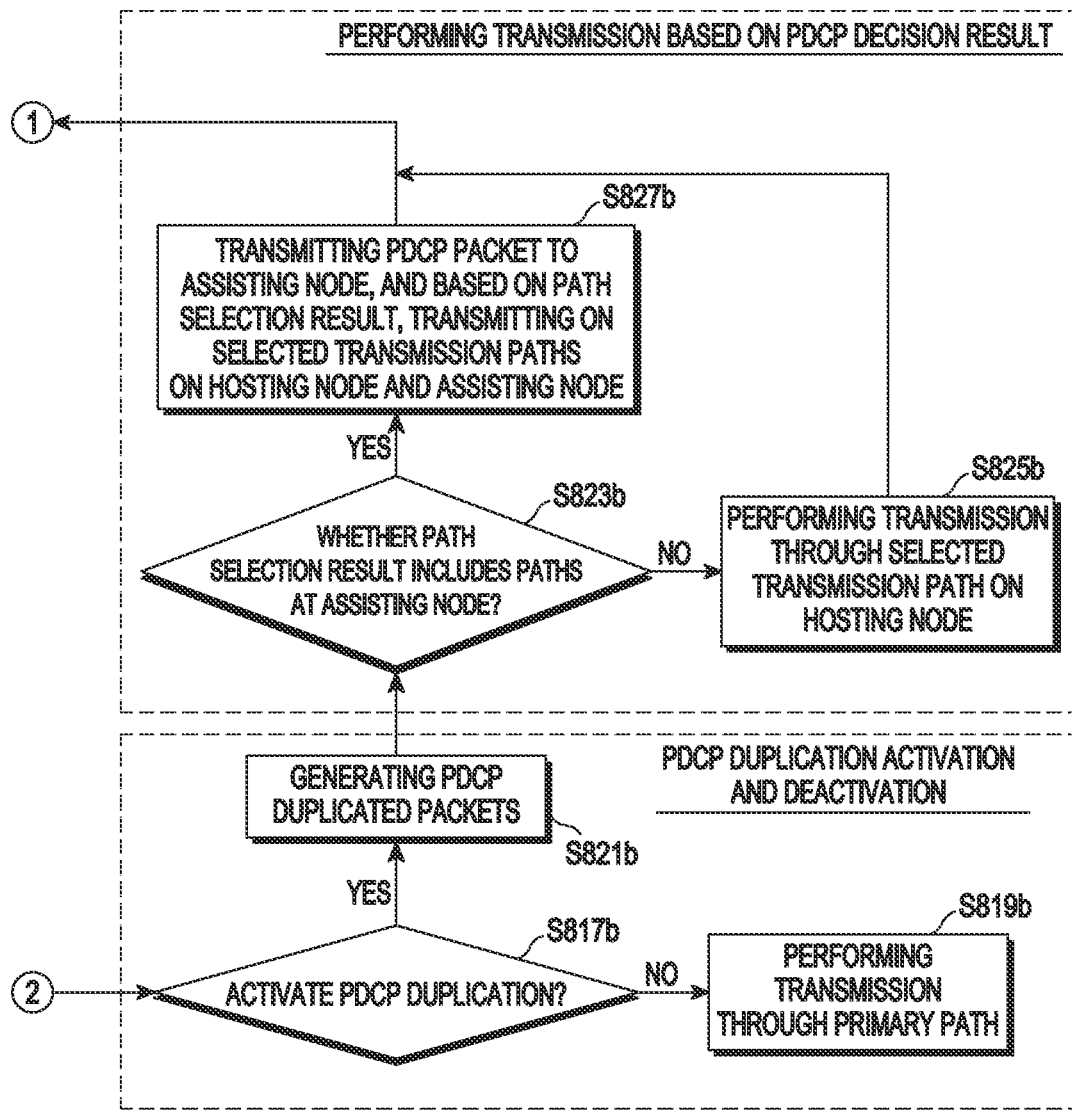

FIGS. 8B and 8C show a flowchart of a method of duplication mechanism activation and path selection according to various embodiments of the disclosure. The embodiment described in connection with FIGS. 8B and 8C may be based on one or more embodiments described in connection with FIG. 8A. The description provided above in connection with FIG. 8A can also be applied to this example embodiment. For example, the duplication mechanism activation and path selection decision for the next moment can be determined based on the past or current path state (for example, by using an AI model), so that packet loss can be avoided to meet the requirements of the QoS, and the resource occupancy rate can be effectively reduced.

According to the embodiment described in connection with FIGS. 8B and 8C, a process of downlink transmission by the hosting node during the PDCP duplication activation and path selection is provided. For example, in the path selection process, the range for paths selection for each UE may be one or more transmission paths configured for the UE in the multi-path configuration stage (for example, as described in connection with embodiments of FIG. 7A, 7B or 7E). For example, the process may include determining to select part or all of the configured transmission paths for transmission at the next moment by using the AI model based on the path state at the current or past time points, so as to reduce the resource occupancy rate and ensure that the QoS meets the requirements.

Referring to FIG. 8A, at operation S801b, the hosting node transmits a reporting configuration to the assisting node. For example, the reporting configuration may include a measurement window, a reporting interval, or a reported content, etc. The assisting node can determine the reported content based on the reporting configuration and transmit the reported content based on the reporting configuration.

Next, at operation S803b, the hosting node decides whether it has received the information reported by the assisting node. If the information reported by the assisting node is received, then operation S805b is performed; if no report from the assisting node is received, then operation S807b is performed.

Then, at operation S805b, the hosting node takes newly collected path states of transmission paths at the hosting node (i.e., path states of transmission paths related to the hosting node) and the assisting node (i.e., path states of transmission paths related to the assisting node) as input path states. After operation S805b is performed, operation S809b is performed.

Next, at operation S807b, the hosting node takes the newly collected path states of the transmission paths at the hosting node and the last reported path states of the transmission paths at the assisting node as the input path states.

Then, at operation S809b, the hosting node decides whether the input path states are similar to the last path states (for example, of the last time point). For example, deciding whether the path states are similar may refer to the embodiment described in connection with FIG. 7A. If the input path states are similar to the last path states, the process proceeds to operation S811b; if the input path states are not similar to the last path states, the process proceeds to operation S813b.

Next, at operation S811b, because the path states are similar, there is no need to perform the PDCP duplication activation decision and path selection decision, and operation S817b is performed. At operation S811b, the hosting node may determine to apply the current PDCP duplication activation decision and path selection decision.

Then, at operation S813b, the hosting node enables the path selection process, including pre-processing the path state and inputting it into the path selection model.

Next, at operation S815b, the hosting node acquires the PDCP duplication activation decision and the path selection decision based on the path selection model. For example, the path selection model may be an AI model (e.g., the fourth AI model in the embodiment described in connection with FIG. 8A). The input of the AI model can be the current path state, and the output of the AI model can be the path selection decision.

Then, at operation S817b, the hosting node decides whether to activate the PDCP duplication mechanism according to the path selection decision. If the path selection decision indicates selecting a single transmission path, then the PDCP duplication is not activated, and operation S819b is performed; if the path selection decision indicates selecting multiple transmission paths, then the PDCP duplication is activated, and operation S821b is performed.

Next, at operation S819b, transmission is performed through the primary path. And the process returns to operation S801b after the transmission is completed.

Then, at operation S821b, the hosting node generates PDCP duplicate packets.

Next, at operation S823b, the hosting node decides whether the path selection result includes the transmission path at the assisting node. If the path selection result does not include the transmission path at the assisting node, operation S825b is performed; if the path selection result includes the transmission path at the assisting node, operation S827b is performed.

Then, at operation S825b, transmission is performed through the selected transmission path on the hosting node. The process returns to perform operation S801b after the transmission is completed.

Then, at operation S827b, the PDCP duplicated packet is transmitted to the assisting node, and based on the path selection result, the transmission of the PDCP duplicated packet is performed on the selected transmission path on the hosting node and the assisting node. The process returns to performing operation S801b after the transmission is completed.

Figure 8D:
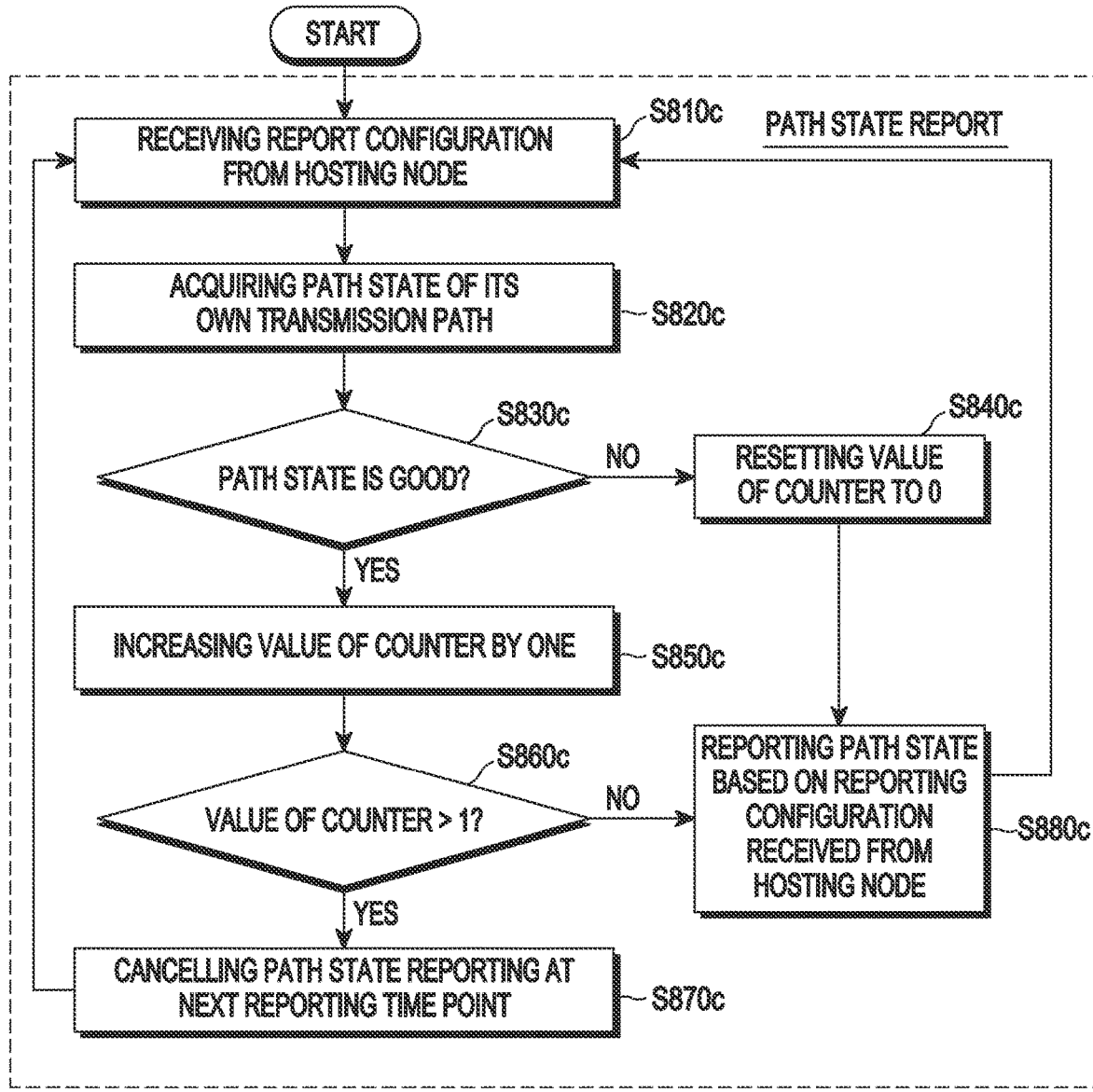
FIG. 8D shows a flowchart of path state reporting according to an embodiment of the disclosure.

FIG. 8D shows a flowchart of path state reporting according to an embodiment of the disclosure.

According to the embodiment described in connection with FIG. 8D, a process of reporting the path state by the assisting node during the duplication mechanism activation and path selection process is provided. Assisting nodes can perform the path state reporting according to their own path conditions. For example, if the path state of the transmission path at the assisting node is good and similar to the path state reported last time, the report will be cancelled. The resource occupancy rate in the reporting process can be reduced by avoiding repeated reporting.

At operation S810c, the assisting node receives the reporting configuration from the hosting node. For example, the reporting configuration may include a measurement window, a reporting interval, a reported content, etc. For example, the reported content may indicate the content that need to be reported by the assisting node, such as the path state of the transmission path at the assisting node.

At operation S820c, the assisting node acquires (e.g., collects) the path state of its own transmission path.

At operation S830c, the assisting node decides whether the path state is good or not. For example, the decision can be made based on whether an evaluation value of the path state of the transmission path at the assisting node is greater than a predetermined threshold value. If the evaluation value is smaller than the threshold value, the path state is poor, and operation S840c is performed; if the evaluation value is greater than or equal to the predetermined threshold value, the path state is good, and operation S850c is performed. An example of determining the evaluation value of the path state can refer to the embodiment described in connection with FIG. 6A, for example, Equation 1.

At operation S840c, a value of a counter is reset to 0, and after the resetting, operation S880c is performed. For example, the counter may count with respect to time units. For example, a time unit may include a time slot, a sub-time slot, or a mini-time slot.

At operation S850c, the value of the counter is increased by 1. For example, operation S850 may be an operation performed after a time unit has elapsed after operation S830.

At operation S860c, it is decided whether the value of the counter is greater than a predetermined value (for example, 1). If the value of the counter is greater than 1, it is indicated that the path state remains good for a continuous time, and operation S870c is performed; if the value of the counter is not greater than 1, operation S880c is performed. In some implementations, if the value of the counter is greater than 1 (e.g., 2), it can be determined that the path state remains good during 2 time units.

At operation S870c, the assisting node cancels the path state reporting at the next reporting time point, and the process returns to operation S810c.

At operation S880c, the assisting node performs the path state reporting based on the reporting configuration received from the hosting node. After the assisting node completes the reporting, the process returns to operation S810c.

According to the embodiment described in connection with FIG. 8D, the assisting node can perform the path state reporting according to its own path condition. For example, if the path state of the transmission path at the assisting node is good and similar to the path state reported last time, the reporting will be cancelled. The resource occupancy rate in the reporting process can be reduced by avoiding repeated reporting.

Figure 8E:
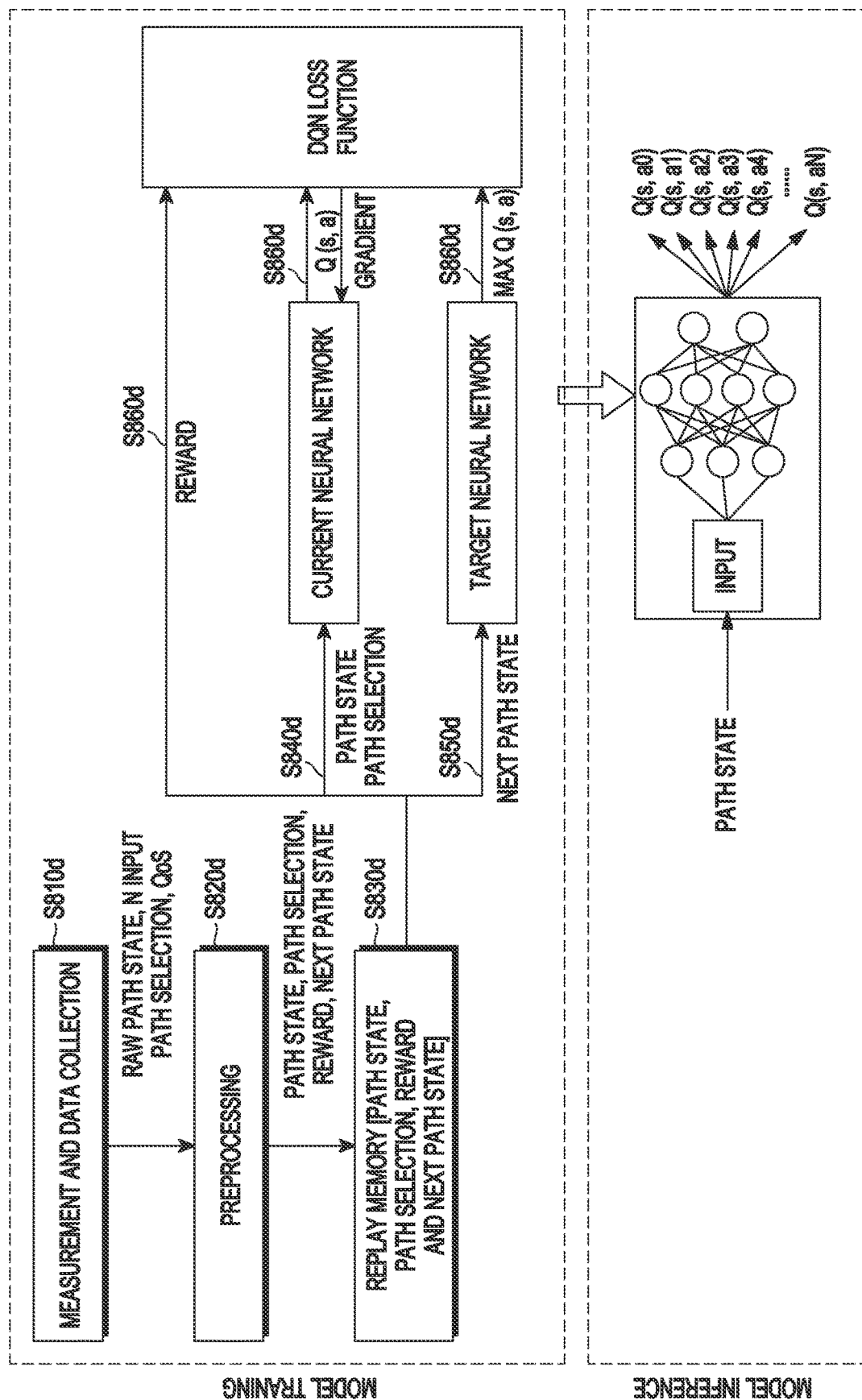
FIG. 8E shows a schematic diagram of the principle of AI model training and inference according to an embodiment of the disclosure.

FIG. 8E shows a schematic diagram of a principle of training and inference of an AI model according to an embodiment of the disclosure. For example, the AI model may include the fourth AI model in the embodiment described in connection with FIG. 8A. The description provided above with reference to FIG. 8A can also be applied to this example embodiment. It should be understood by those skilled in the art that the embodiment described in connection with FIG. 8E can be applied to the training and inference of various AI models of the disclosure after slight modification.

According to the embodiment described in connection with FIG. 8E, a model training process based on the DQN and model inference process are provided. Particularly, the AI model may include a neural network. In this case, the neural network can be trained by using a DQN principle and inferenced for path selection.

Referring to FIG. 8E, the model training process may include operations S810d to S860d.

At operation S810d, network data is measured and collected. The collected data may include raw path state, N input path selections and QoS parameter(s). The raw path state may include a CQI, an MCS, an HARQ failure rate, an HARQ retransmission rate, etc. The N input path selections can be N bits representing the selection results of N (N can be a positive integer) paths, one bit in multiple bits represents a transmission path, and the N bits can be arranged in a predetermined order; for example, if the bit is "1", it means that this transmission path is selected; if the bit is "0", this transmission path is not selected. The QoS parameter(s) may include a packet loss rate and a delay of a PDCP transmission.

At operation S820d, the pre-processor pre-processes the collected data. For example, the pre-processing method may include:

Normalization or partial normalization of the path state.

Converting N input path selections into a path selection. For example, if "0001" means to select a fourth path among four available paths, "0001" will be converted into the first path selection.

Converting QoS parameter(s) into rewards. For example, QoS parameter(s) can be converted into a single reward based on the packet loss rate, the delay and the number of selected transmission paths by using predetermined rules. In one implementation, such rules can be adopted, if the QoS parameter(s) (for example, the packet loss rate) is greater than or equal to the threshold value, one predetermined method is used for the conversion to the single reward; if the QoS parameter(s) (e.g., the packet loss rate) is smaller than or equal to the threshold value, another predetermined method is used for the conversion to the single reward.

The reward conversion method comprises one or more of the following methods:

$$R = \frac{a}{N_{PN}} + b + \frac{c}{D_{delay}} \qquad \text{Equation 2}$$

$$R = \frac{d}{N_{PN} - e} - DR_{drop} * f + \frac{g}{D_{delay}} \qquad \text{Equation 3}$$

$$R = -N_{FN} * h + i \qquad \text{Equation 4}$$

$$R = j \qquad \text{Equation 5}$$

$$R = -N_{PN} * k + l + \frac{m}{D_{delay}} \qquad \text{Equation 6}$$

$$R = -N_{PN} * n - DR_{drop} * o + \frac{p}{D_{delay}} \qquad \text{Equation 7}$$

In Equation 2 to Equation 7, R indicates the reward, $N_{PN}$ indicates the number of the selected transmission paths, $D_{delay}$ indicates the delay, $DR_{drop}$ indicates the packet loss rate, and a, b, c, d, e, f, g, h, i, j, k, l, m, n, o, p indicate constants respectively.

The next path state can be set as the path state at the next moment or other values.

At operation S830d, the path state, the path selection, the reward and the next path state are stored in sequence, in which one set is one piece of data, and multiple pieces of data are randomly selected from them.

At operation S840d, the path state and path selection are input into the current neural network, and a corresponding value (Q value) is obtained. The Q (s, a) in FIG. 8E represents the Q value when the path state is s and the path selection is a.

At operation S850d, the next path state is input into the target neural network, and the corresponding Q value is obtained. The maximum Q value is selected from the obtained multiple Q values.

At operation S860d, the reward, the Q value obtained through operation S840d, and the maximum Q value obtained at operation S850d are input into a DQN loss function to obtain a corresponding gradient. The gradient is then returned to the current neural network for optimizing the current neural network, and the optimized neural network replaces the target neural network.

Operations S830d, S840d, S850d and S860d are executed in loop until the target neural network converges. The converged target neural network (i.e., the trained neural network) is the final training result and is used for transmission path selection.

In the model inference stage, the pre-processed path state is input into the trained neural network. The pre-processing method of the model inference stage can be the same as or different from the one used in the model training stage. The output of the neural network is Q values corresponding to different path selections, including, for example, Q (S, a0), Q (S, a1), . . . , Q (S, aN). The path selection decision corresponding to the maximum Q value among those Q values is selected, and the path selection decision is restored to the N input path selection decisions based on the same rules as the one in the pre-processing in the model training stage, thus the final path selection decision is obtained.

It should be illustrated that although the AI model is illustrated by taking a neural network as an example, embodiments of the disclosure are not limited thereto. The AI model can include various types of machine learning models. Machine learning models can include linear models and nonlinear models. For example, machine learning models may include regression models, support vector machines, decision tree-based models, Bayesian models, or neural networks (e.g., deep neural networks). For example, neural networks may include feedforward neural networks, recursive neural networks (e.g., long short-term memory recursive neural networks), convolutional neural networks, or other forms of neural networks.

In some implementations, the AI model can use online learning or offline learning. When online learning is used, the AI model collects real-time data to update the model while outputting an inference result, so that the model can be updated continuously to adapt to new data.

In some implementations, the AI model can be divided into multiple models from a single model, and intermediate parameters can be used as references. For example, the AI model for path selection can generate intermediate QoS prediction parameters, and then generate path selection decisions. The intermediate parameters QoS prediction parameters can be used for other purposes, such as resource allocation, etc.

Figure 8F:
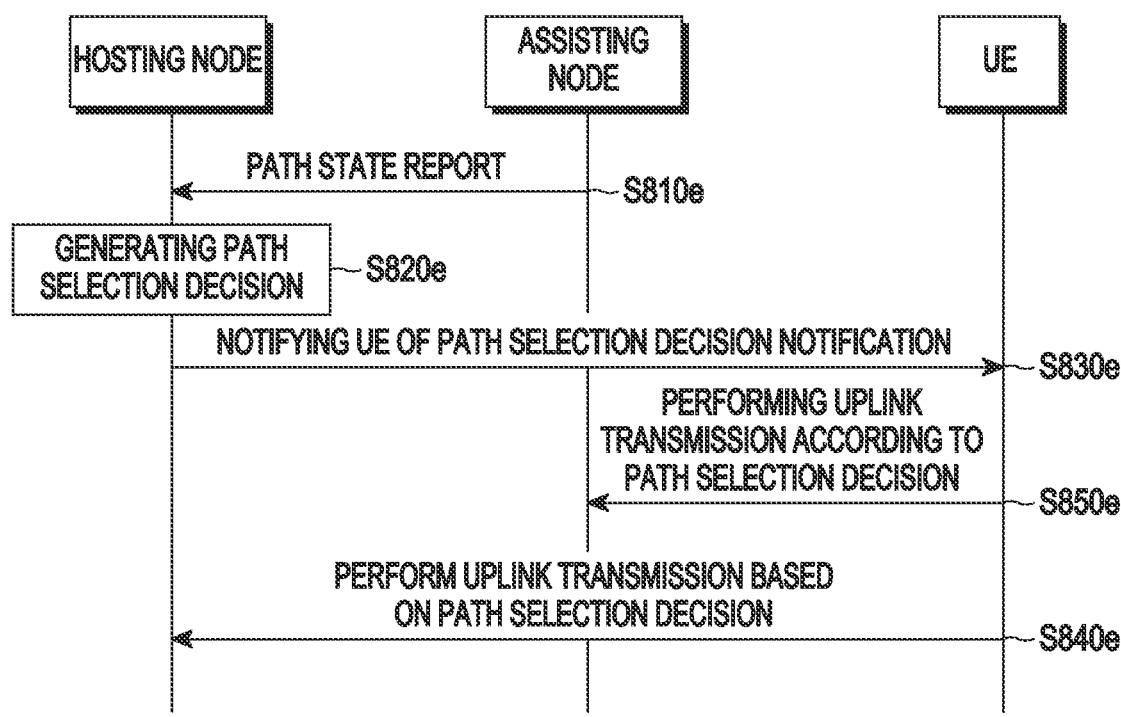
FIG. 8F illustrates a flowchart of a method of path selection according to an embodiment of the disclosure.

FIG. 8F shows a flowchart of a method of path selection according to an embodiment of the disclosure.

Referring to FIG. 8F, there is provided an uplink transmission process in which the duplication mechanism activation and the path selection process performs centralized path selection. For example, the process can predict the PDCP duplication activation decision and path selection decision of the uplink transmission (for example, by using the AI model), so as to accurately select partial uplink transmission paths to meet the QoS requirements and reduce uplink transmission resource occupancy. For example, the AI model can be deployed at the hosting node.

At operation S810e, the assisting node reports the path state(s) of the transmission path(s) at the assisting node to the hosting node. For example, the path state of each transmission path may include one or more of a MCS, an HARQ failure rate, or an HARQ retransmission rate of the transmission path.

At operation S820e, the hosting node determines (e.g., generates) a path selection decision for uplink transmission according to the path state(s) of its own transmission path(s) and the path state(s) reported by the assisting node. In some implementations, the corresponding path selection decision can be generated based on the path state (e.g., the MCS, the HARQ failure rate, or the HARQ retransmission rate) of each transmission path by using an AI model (e.g., the fourth AI model or the sixth AI model in the embodiment described in connection with FIG. 8A).

At operation S830e, the assisting node notifies the UE of the path selection decision. The path selection decision can be transmitted to the UE via MAC CE or RRC signaling, for example.

At operation S840e, or at operation S850e: the UE performs uplink transmission based on the received path selection decision.

In some implementations, when the path selection decision indicates that at least one transmission path at the hosting node and at least one transmission path at the assisting node are selected, the UE may perform both operations S840e and S850e, that is, perform uplink transmission to the hosting node based on the selected transmission path at the hosting node and perform uplink transmission to the assisting node based on the selected transmission path at the assisting node. It should be noted that although operations S840e and S850e are shown as separate steps, these two operations can be performed simultaneously.

In some implementations, when the path selection decision indicates that only the at least one transmission path at the hosting node is selected, the UE may perform operation S840e without performing operation S850e.

The method of path selection according to some embodiments of the disclosure has been described above in connection with FIG. 8F. In the method, by predicting the PDCP duplication activation decision and path selection decision of uplink transmission, partial uplink transmission paths can be accurately selected to meet the QoS requirements and reduce the occupancy of uplink transmission resources.

Figure 8G:
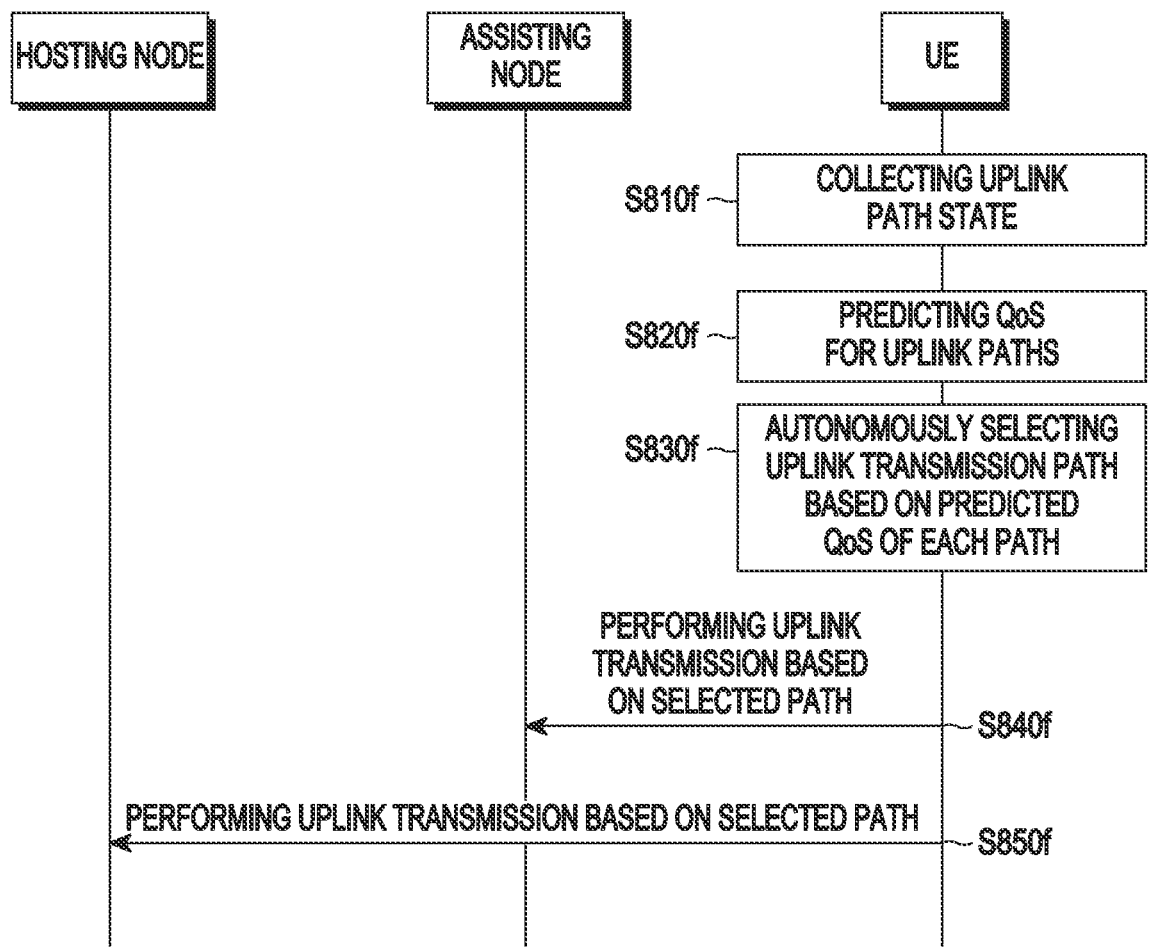
FIG. 8G illustrates a flowchart of a method of path selection according to an embodiment of the disclosure

FIG. 8G shows a flowchart of a method of path selection according to an embodiment of the disclosure.

Referring to FIG. 8G, an uplink transmission process for autonomous transmission path selection of the PDCP duplication activation and path selection stage is provided. This process can (for example, by using an uplink QoS prediction model (for example, the seventh AI model in the embodiment described in connection with FIG. 8A) deployed at the UE side) predict the uplink QoS at the next moment based on the path state of the uplink transmission path, so as to select partial transmission paths for uplink transmission, so as to reduce the uplink resource occupancy rate while guaranteeing the QoS. The description provided above in connection with FIG. 8A can also be applied to this example embodiment.

Referring to FIG. 8G, at operation S810f, the UE acquires (e.g., collects) the path state(s) of the uplink transmission path(s). The path state of each transmission path may include one or more of the MCS, the HARQ failure rate, or the HARQ retransmission rate of the transmission path.

At operation S820f, the UE predicts QoS parameter(s) of the uplink transmission path(s) based on the uplink transmission path state. For example, the QoS parameter(s) of each uplink transmission path may include a delay, a packet loss rate, etc. For example, the UE may predict the QoS parameter(s) of the uplink transmission path(s) based on the path state of the uplink transmission path(s) by using an AI model (e.g., in the embodiment described in connection with FIG. 8A).

At operation S830f, the UE autonomously selects the uplink transmission path(s) according to the predicted QoS parameter(s) of each transmission path.

At operation S840*f* or operation S850*f*, the UE performs uplink transmission based on the selected uplink transmission path(s).

In some implementations, when the UE selects the at least one transmission path at the hosting node and the at least one transmission path at the assisting node, the UE may perform both operations S840*f* and S850*f*, that is, perform uplink transmission to the hosting node based on the selected transmission path at the hosting node and perform uplink transmission to the assisting node based on the selected transmission path at the assisting node. It should be noted that although operations S840*f* and S850*f* are shown as separate operations, these two operations can be performed simultaneously.

In some implementations, when the UE selects the at least one transmission path at the hosting node only, the UE may perform operation S840*f* without performing operation S850*f*.

The method of path selection according to some embodiments of the disclosure has been described above in connection with FIG. 8G. With this method, the uplink QoS at the next moment is predicted based on the path state of the uplink transmission path, to select partial transmission paths for uplink transmission, so that the uplink resource occupancy rate is reduced while the QoS is guaranteed.

Figure 9A:
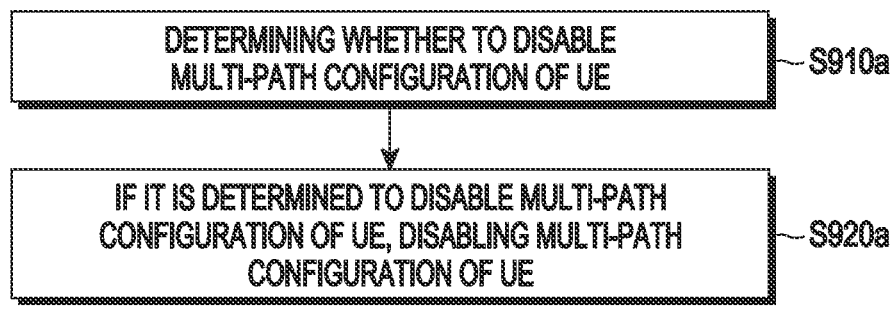
FIG. 9A illustrates a flowchart of a method for disabling multi-path configuration according to an embodiment of the disclosure.

FIG. 9A shows a flowchart of a method for disabling multi-path configuration according to an embodiment of the disclosure.

According to the embodiment described in connection with FIG. 9A, it can be determined whether a UE needs to continue configuring multiple paths. For example, if the UE meets the disabling condition for a continuous time, multi-path configuration of the UE is disabled to ensure that the UE can keep QoS meeting the requirements under a single-path configuration, thereby reducing unnecessary multi-path configuration.

Referring to FIG. 9A, at operation 910*a*, the node determines whether to disable the multi-path configuration of the UE. For example, when it is determined that the UE meets a predetermined disabling condition for a second predetermined time, it is determined to disable the multi-path configuration of the UE.

In some implementations, the disabling deciding conditions may include: a selected path being a primary path and meeting uplink or downlink PDCP QoS requirements; or the QoS meeting or exceeding predetermine QoS requirements (for example, a value indicated by information on the QoS is greater than or equal to a predetermined eighth threshold value). In this case, when the state where the disabling condition is satisfied is maintained for at least the second predetermined time (e.g., the predetermined number of time slots (e.g., the predetermined number of continuous time slots), sub-slots, or mini-slots), it may be determined that the multi-path configuration of the UE is to be disabled.

Next, at operation 910*a*, if it is determined to disable the multi-path configuration of the UE, the multi-path configuration of the UE is disabled. For example, disabling the multi-path configuration of the UE may include using the primary path as the main transmission path of the UE for a single-path connection, and removing the UE from a specific UE group (e.g., a specific UE group or a second-stage group in the embodiments described in connection with FIG. 7A or 7B) to which it belongs.

The method for disabling multi-path configuration according to some embodiments of the disclosure has been described above in connection with FIG. 9A. With this method, the multi-path configuration of the UE is disabled under the condition that predetermined conditions are satisfied, so as to ensure that the UE can keep the QoS meeting the requirements under the single-path configuration, thereby reducing unnecessary multi-path configuration.

Figure 9B:
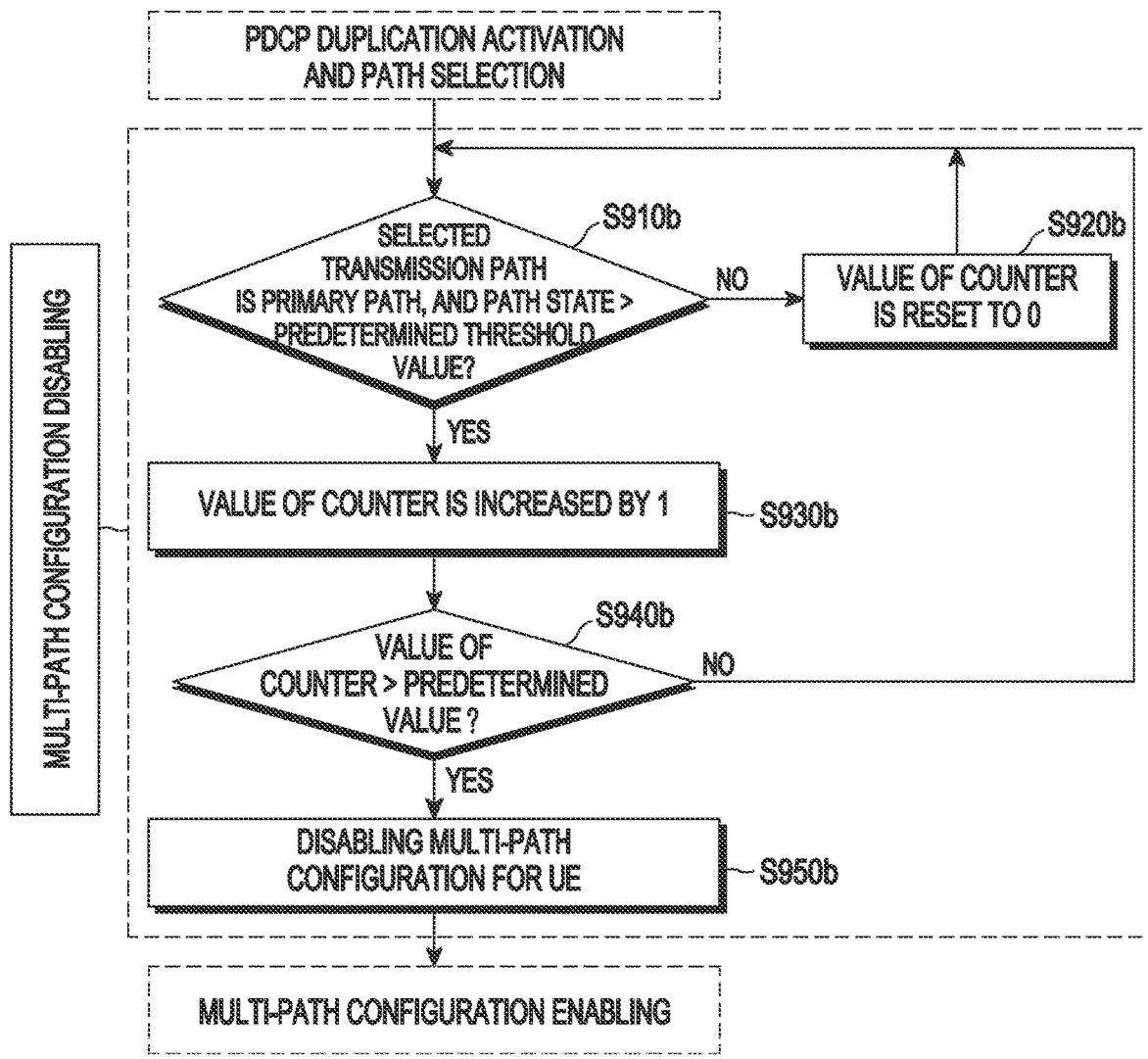
FIG. 9B illustrates a flowchart of a method for disabling multi-path configuration according to an embodiment of the disclosure.

FIG. 9B illustrates a flowchart of a method for disabling multi-path configuration according to an embodiment of the disclosure.

According to the embodiment described in connection with FIG. 9A, a node (e.g., a base station) may determine whether the UE needs to continue configuring multiple paths. For example, the embodiment described in connection with FIG. 9B may be based on the embodiment described in connection with FIG. 9A. The description provided above with reference to FIG. 9A can also be applied to this example embodiment. In some implementations, it can be determined whether a single path of the UE can meet the QoS requirements based on the path selection decision and the path state, and if yes, it is not necessary to continue multi-path configuration, so as to reduce the resource occupancy rate and improve the resource efficiency.

Referring to FIG. 9B, at operation S910*b*, the node determines that the selected transmission path is the primary path, and the path state of the primary transmission path is greater than (or equal to) a predetermined threshold value. When the path state of the primary transmission path is greater than the threshold value, it can be determined that the path state of the single path is good. If the path state of the primary transmission path is not greater than the threshold value, operation S920*b* is performed; if the path state of the primary transmission path is greater than the threshold value, operation S930*b* is performed. In some implementations, the node may comprise a hosting node.

At operation S920*b*, the value of the counter is reset to 0, and after the resetting, operation S910*b* is performed. For example, the counter may count for time units. For example, a time unit may include a time slot, a sub-time slot, or a mini-time slot.

At operation S930*b*, the value of the counter is increased by 1.

At operation S940*b*, it is determined whether the value of the counter is greater than a predetermined value (for example, 1). If the value of the counter is greater than a predetermined value (e.g., 1), it can be determined that the path state remains in a good state for continuous time, and operation S950*b* is performed; if the value of the counter is not greater than the predetermined value (for example, 1), the process returns to operation S910*b*.

At operation S950*b*, the multi-path configuration of the UE is disabled and the process returns to the single-path configuration. For example, disabling the multi-path configuration of the UE may include using the primary path as the main transmission path of the UE for the single-path connection, and removing the UE from a specific UE group (e.g., a specific UE group or a second-stage group in the embodiment described in connection with FIG. 7A or 7B) to which it belongs.

In some implementations, after this stage is completed, for a UE with single-path configuration, the process may return to a multi-path configuration enabling procedure (such as the embodiment described in connection with FIG. 6A or 6B).

The method for disabling multi-path configuration according to some embodiments of the disclosure has been described above with reference to FIG. 9B. With this method, the multi-path configuration of the UE is disabled under the condition that the predetermined conditions are satisfied, so as to ensure that the UE can keep the QoS meeting the requirements under the single-path configuration, thereby reducing unnecessary multi-path configuration.

Figure 10:
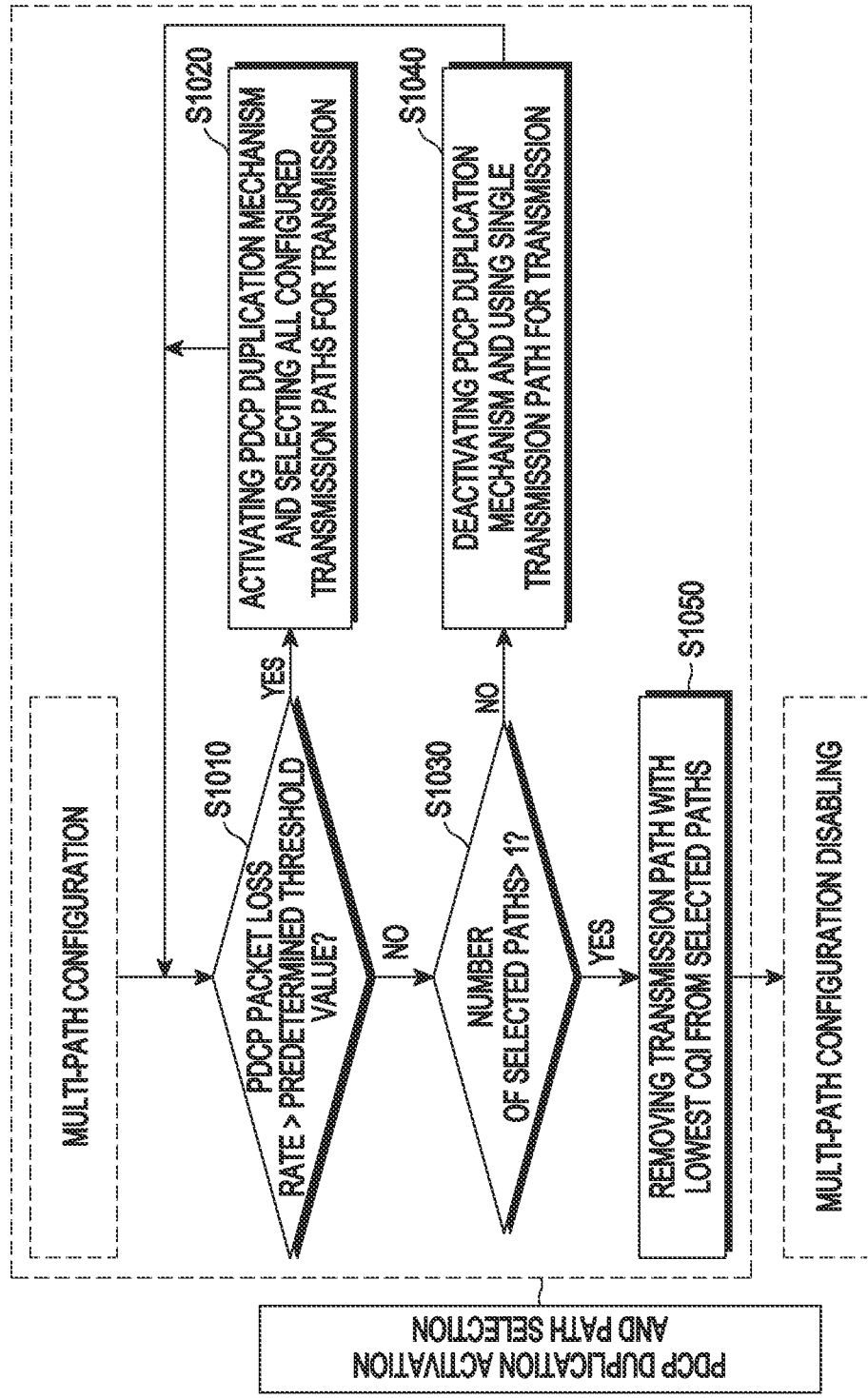
FIG. 10 shows a flowchart of a method of duplication mechanism activation and path selection according to an embodiment of the disclosure.

FIG. 10 shows a flowchart of a method of PDCP duplication activation and path selection according to an embodiment of the disclosure.

Referring to FIG. 10, a transmission process in which the duplication mechanism activation and the path selection process performs centralized path selection is provided.

At operation S1010, the hosting node decides whether the QoS parameter(s) meet the requirements. The judgement method can be whether a PDCP packet loss rate is greater than (or equal to) a predetermined threshold value. The process proceeds to operation S1020 if the PDCP packet loss rate is greater than (or equal to) the predetermined threshold value, otherwise the process proceeds to operation S1030. The preset threshold value is greater than the QoS requirement value of the service.

At operation S1020, the hosting node activates the PDCP duplication mechanism and selects all of configured transmission paths for transmission.

At operation S1030, the hosting node decides whether the number of currently selected paths is greater than a predetermined number (for example, 1). The process proceeds to operation S1040 if the number of currently selected transmission paths is not greater than (or equal to) a predetermined number (for example, 1), otherwise the process proceeds to operation S1050.

At operation S1040, the PDCP duplication mechanism is deactivated and the current single transmission path is used for transmission.

At operation S1050, the transmission path with the lowest CQI is removed from the selected paths, and the remaining selected transmission paths are used for transmission.

The operations S1010 to S1050 are performed in loop until a multi-path configuration disabling condition is satisfied. When the multi-path configuration disabling condition is satisfied, the multi-path configuration is disabled.

The method of PDCP duplication activation and path selection according to some embodiments of the disclosure has been described above in connection with FIG. 10. In this method, the packet loss rate can be reduced by activating the PDCP duplication mechanism in time and using all the configured transmission paths for transmission. When the currently selected path can result in better QoS parameter(s), the selected transmission paths are reduced to guarantee the QoS requirements and reduce the transmission resource occupancy.

Figure 11:
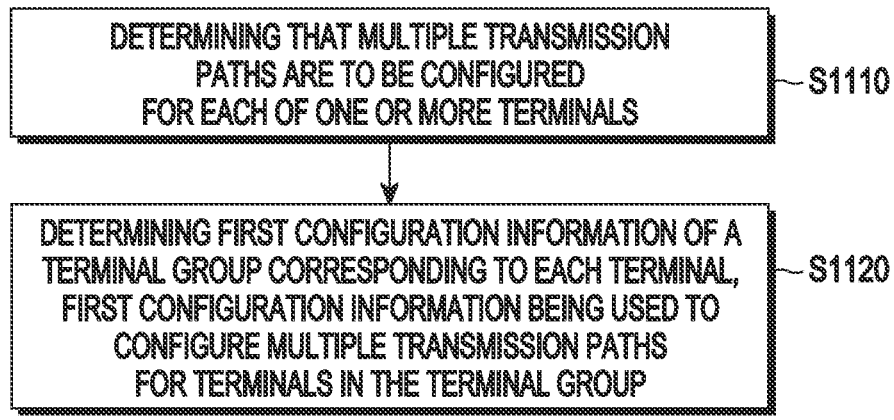
FIG. 11 shows a flowchart of a method performed by a base station according to an embodiment of the disclosure.

FIG. 11 shows a flowchart of a method performed by a base station according to an embodiment of the disclosure.

Referring to FIG. 11, at operation S1110, it is determined that multiple transmission paths are to be configured for each of one or more terminals.

In some implementations, for example, determining that multiple transmission paths are to be configured for each of the one or more terminals may include: determining that multiple transmission paths are to be configured for each of the one or more terminals based on at least one of information on quality of service (QoS) and information on a path state of a main transmission path of each of the one or more terminals, wherein the main transmission path is a transmission path when the terminal is not configured with multiple transmission paths.

In some implementations, for example, determining that multiple transmission paths are to be configured for each of the one or more terminals based on at least one of the information on the QoS and the information on the path state of the main transmission path of each of the one or more terminals includes: acquiring the information on the QoS and information on the path state of the main transmission path of the terminal; and determining that multiple transmission paths are to be configured for the terminal in response to a value indicated by the information on the QoS being smaller than or equal to a predetermined first threshold value or an evaluation value determined based on the information on the path state of the main transmission path being smaller than or equal to a predetermined second threshold value.

In some implementations, for example, the information on the path state of the main transmission path includes at least one of a channel quality indicator (CQI) of the main transmission path, a hybrid automatic repeat request (HARQ) failure rate of the main transmission path, or an HARQ retransmission rate of the main transmission path.

In some implementations, for example, the evaluation value determined by the information on the path state of the main transmission path is determined by: $PS\_E=V\_CQI*(1-R1\_HARQ)*2^{(2-R2\_HARQ)}$, wherein PS_E indicates the evaluation value, V_CQI indicates the value indicated by the CQI, R1_HARQ indicates the HARQ failure rate, and R2_HARQ indicates the HARQ retransmission rate.

In some implementations, for example, the information on the QoS includes at least one of a delay related to a packet data convergence protocol (PDCP) transmission or a packet loss rate related to the PDCP transmission.

Then, at operation S1120, first configuration information of a terminal group corresponding to each terminal is determined, the first configuration information is used to configure multiple transmission paths for the terminals in the terminal group.

In some implementations, for example, determining the first configuration information of the terminal group corresponding to each terminal includes: determining the terminal group corresponding to each terminal based on at least one of a path state of the main transmission path, a signal quality measurement result, a geographical location or a service type of each terminal among the one or more terminals; acquiring the first configuration information of the terminal group.

In some implementations, for example, determining the terminal group corresponding to each terminal includes: grouping based on the path state of the main transmission path and the service type of each of the one or more terminals to obtain at least one first terminal group; and for the at least one first terminal group: selecting an candidate transmission path for each terminal based on a signal quality measurement result of each terminal in the first terminal group, and grouping terminals with same candidate transmission paths in the first terminal group into a first terminal subgroup as one of multiple terminal groups.

In some implementations, for example, the candidate transmission paths include a transmission path whose signal quality is higher than a predetermined third threshold value. For example, the signal quality includes at least one of a reference signal received power RSRP, a reference signal received quality RSRQ, or a signal to interference plus noise ratio SINR.

In some implementations, for example, grouping terminals with a same candidate transmission path in a first terminal group into a first terminal subgroup as one of multiple terminal groups includes: removing one or more terminals from the first terminal subgroup based on the geographical location of each terminal in the first terminal group, and taking the first terminal subgroup after removing the one or more terminals as one of multiple terminal groups.

In some implementations, for example, grouping the terminals in the one or more terminals into the terminal group based on at least one of the path state of the main transmission path, the measurement report, the geographical location or the service type of each of the one or more terminals includes: grouping the terminals in the one or more terminals into the terminal group by using a first artificial intelligence model. The first artificial intelligence model is trained to output information on the terminal group based on at least one of the path state of the main transmission path, the measurement report, the geographical location or the service type of each of the one or more terminals as an input.

In some implementations, for example, determining the first configuration information includes determining multiple transmission paths for each terminal in the terminal group, wherein determining multiple transmission paths for each terminal in the terminal group includes: repeatedly performing an operation of selecting a transmission path with a highest signal quality that has not been selected from candidate transmission paths of the terminal until a preset condition is satisfied; and determining the selected one or more transmission paths as the multiple transmission paths for each terminal in the terminal group, and wherein the main transmission path is determined as the primary path.

In some implementations, for example, if the assisting node has been determined, when selecting the transmission path with the highest signal quality that has not been selected from the candidate transmission paths of the terminal, the selection is made only from a transmission path related to the hosting node and a transmission path related to the determined assisting node.

In some implementations, for example, if the assisting node has not been determined, when selecting the transmission path with the highest signal quality that has not been selected from the candidate transmission paths of the terminal, the selection is made from the transmission path related to the hosting node and transmission paths related to other nodes.

In some implementations, for example, if the selected transmission path is not in the hosting node and the assisting node has not been determined, it is determined that the node where the transmission path is located is the assisting node.

In some implementations, for example, determining the multiple transmission paths for each terminal in the terminal group includes: determining the multiple transmission paths for each terminal in the terminal group by using a second artificial intelligence model. The second artificial intelligence model is trained to output the first configuration information based on at least one of the path state of the main transmission path, the measurement report, the geographic location or the service type of each terminal in the terminal group as an input or based on at least one of an average measurement report and a service type of the terminal group that are input. The average measurement report includes at least one of the reference signal received power RSRP, the reference signal received quality RSRQ, or the signal to interference plus noise ratio SINR.

In some implementations, for example, the preset condition includes at least one of the following: a sum of signal qualities of the selected one or more transmission paths being greater than a predetermined fourth threshold value, or the number of the selected one or more transmission paths reaching a predetermined fifth threshold value. For example, the signal qualities are determined based on a measurement report including at least one of the reference signal received power RSRP, the reference signal received quality RSRQ, or the signal to interference plus noise ratio SINR.

In some implementations, for example, the first configuration information includes one or more of identification information of the assisting node, identification information of a path related to the hosting node among the selected one or more transmission paths, or identification information of a path related to the assisting node among the selected one or more transmission paths.

In some implementations, for example, if a value indicated by the information on the QoS of at least one of one or more terminals is smaller than a sixth threshold value during a predetermined time period, the terminal group corresponding to the at least one terminal is re-determined.

In some implementations, for example, the sixth threshold value is greater than the value corresponding to the QoS requirements of the PDCP transmission.

In some implementations, for example, determining configuration information of at least one terminal grouped into a terminal group among the one or more terminals includes: determining multiple transmission paths for each terminal in the terminal group, wherein the multiple transmission paths for each terminal in the terminal group are determined by a third artificial intelligence model. The configuration information includes one or more of the identification information of the assisting node, the identification information of the transmission path related to the hosting node among the selected one or more transmission paths, or the identification information of the transmission path related to the assisting node among the selected one or more transmission paths.

In some implementations, for example, the method further includes receiving information on the path states of the one or more transmission paths related to the assisting node from the assisting node.

In some implementations, for example, for each transmission path among the one or more transmission paths related to the assisting node, the information on the path states of the transmission paths is not transmitted by the assisting node, in response to the evaluation value determined based on the information on the path states of the transmission paths being greater than a seventh threshold value and the path states of the transmission paths being maintained for at least a first predetermined time.

In some implementations, for example, it is determined whether to activate packet duplication based on the path states of the one or more transmission paths related to the hosting node and the path states of one or more transmission paths related to the assisting node.

In some implementations, for example, the path states of the one or more transmission paths related to the hosting node includes the path states of one or more transmission paths related to the hosting node at the latest moment or the path states of one or more transmission paths related to the hosting node at the current moment.

In some implementations, for example, the path states of the one or more transmission paths related to the assisting node reported by the assisting node includes the path states of the one or more transmission paths related to the assisting node at the latest moment or the path states of the one or more transmission paths related to the assisting node at the current moment.

In some implementations, for example, the method further includes: selecting multiple transmission paths for data packet duplication transmission based on the path states of the one or more transmission paths related to the hosting node and the path states of one or more transmission paths related to the assisting node.

In some implementations, for example, whether to activate data packet duplication and select multiple transmission paths for data packet duplication transmission is determined by a fourth artificial intelligence model. The fourth artificial intelligence model is trained to output information on whether to activate data packet duplication and information on multiple transmission paths for data packet duplication transmission, based on the path states of the one or more transmission paths related to the hosting node and the path states of the one or more transmission paths related to the assisting node as inputs.

In some implementations, for example, the method further includes transmitting second configuration information to the at least one terminal, the second configuration information including information on whether to activate data packet duplication and information on the multiple transmission paths for data packet duplication transmission.

In some implementations, for example, the second configuration information is transmitted to the at least one terminal via a medium access control (MAC) control element (CE) or a radio resource control (RRC) message.

In some implementations, for example, the method further comprises, in response to determining that one of the at least one terminal satisfies a predetermined condition for a continuous second predetermined time, disabling the multiple transmission paths of the terminal configured by the first configuration information.

In some implementations, for example, the predetermined condition includes at least one of the following: the selected transmission path for the terminal including the primary path and meeting the QoS requirements of PDCP transmission; or the value indicated by the information on the QoS being greater than or equal to a predetermined eighth threshold value.

In some implementations, for example, the method further includes transmitting the first configuration information to the at least one terminal.

In some implementations, for example, the method further includes transmitting the first configuration information to the at least one terminal via a MAC CE or a radio resource control (RRC) message.

It should be noted that various methods in embodiments described with reference to FIGS. 6A to 10 can also be applied to the embodiment of FIG. 11.

Figure 12:
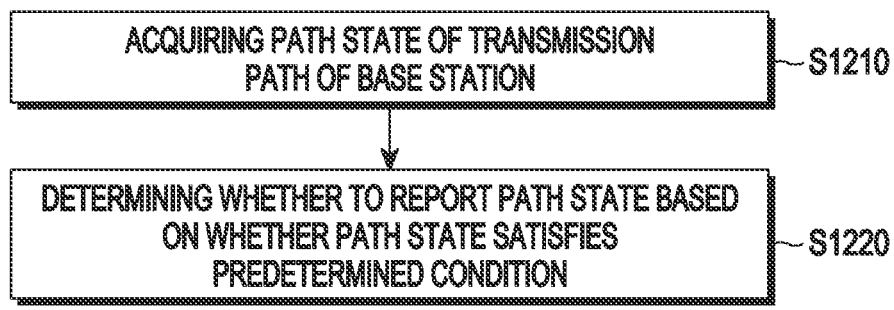
FIG. 12 shows a flowchart of a method performed by a base station according to an embodiment of the disclosure.

FIG. 12 shows a flowchart of a method performed by a base station according to an embodiment of the disclosure.

Referring to FIG. 12, at operation S1210, the path state of the transmission path of the base station is acquired.

In some implementations, for example, the path state may include at least one of a channel quality indicator (CQI), a hybrid automatic repeat request (HARQ) failure rate, or an HARQ retransmission rate.

Then, at operation S1220, it is determined whether to report the path state based on whether the path state satisfies a predetermined condition.

In some implementations, for example, determining whether to report the path state based on whether the path state satisfies a predetermined condition includes: determining not to report the path state of the transmission path, when the evaluation value determined based on the path state of the transmission path is greater than (or equal to) a threshold value and the path state of the transmission path is maintained for at least a predetermined time.

In some examples, the evaluation value is determined by: $PS\_E = V\_CQI*(1-R1\_HARQ)*2^{(2-R2\_HARQ)}$, wherein PS_E a indicates the evaluation value, V_CQI indicates the value indicated by the CQI, R1_HARQ indicates the HARQ failure rate, and R2_HARQ indicates the HARQ retransmission rate.

In some implementations, for example, when the evaluation value determined based on the path state of the transmission path is smaller than or equal to the threshold value and the path state of the transmission path is maintained for less than the predetermined time, it is determined to report the path state of the transmission path.

In some implementations, for example, the method further comprises, when it is determined to report the path state of the transmission path, reporting the path state to another base station.

In some implementations, for example, the base station may be an assisting node of a dual connectivity configured for a terminal, and the other base station may be a hosting node of the dual connectivity. In this case, the method in the embodiment described in connection with FIG. 8D can be applied to the embodiment of FIG. 12.

Various embodiments of the disclosure have been described with reference to FIGS. 6A to 12. It should be noted that although various embodiments are described in a separate way, those skilled in the art should understand that one or more of these embodiments can be combined to form a new embodiment as required, and the formed new embodiment should also belong to a part of this disclosure.

Figure 13:
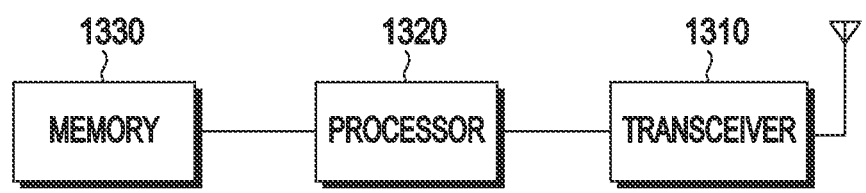
FIG. 13 shows a block diagram of a configuration of a terminal according to an embodiment of the disclosure.

FIG. 13 shows a block diagram of a configuration of a terminal according to an embodiment of the disclosure.

Referring to FIG. 13, a terminal 1300 according to an embodiment of the disclosure may include a transceiver 1310, at least one processor 1320, and a memory 1330. A terminal may be implemented to include a greater or smaller number of elements than those shown in FIG. 13.

The transceiver 1310 may transmit signals to or receive signals from another terminal, base station, or network entity. The transceiver 1310 may receive, for example, downlink data packets from a base station and may transmit uplink data packets to the base station.

The processor 1320 may control an overall operation of the terminal. For example, the processor 1320 may control the transceiver 1310 and the memory 1330 to select a transmission path and transmit data packets through the selected path.

The memory 1330 may store information, data, programs, instructions, and the like processed by the terminal.

Figure 14:
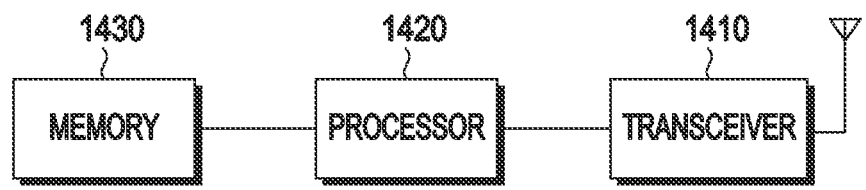
FIG. 14 shows a block diagram of a configuration of a base station according to an embodiment of the disclosure.

FIG. 14 shows a block diagram of a configuration of a base station according to an embodiment of the disclosure.

For example, a structure of the base station shown in FIG. 14 shows a structure of a HN or an signaling involved in DC.

Referring to FIG. 14, the base station 1400 according to the above embodiment may include a transceiver 1410, at least one base station processor 1420 and a memory 1430. The base station may be implemented to include a greater or smaller number of elements than those shown in FIG. 14.

The transceiver 1410 may transmit signals to or receive signals from a terminal, another base station, or a network entity. The transceiver 1410 may receive uplink data packets from terminals and may transmit downlink data packets to terminals, for example.

The processor 1420 may control an overall operation of the base station. For example, the processor 1420 may control the transceiver 1410 and the memory 1430 to select a transmission path and transmit data packets through the selected path.

The memory 1430 may store information, data, programs, instructions, and the like processed by the base station.

According to the embodiments of the disclosure, at least a part of an apparatus (e.g., a module or a function thereof) or a method (e.g., an operation or a step) may be implemented as instructions stored in a computer-readable storage medium (e.g., a memory), for example, in the form of a program module. When executed by the processor or controller, the instructions may enable the processor or controller to perform corresponding functions. Computer readable media can include, for example, hard disks, floppy disks, magnetic media, optical recording media, DVDs, and magneto-optical media. The instructions may include codes created by a compiler or codes executable by an interpreter. The module or apparatus according to various embodiments of the disclosure may include at least one or more of the above components, some of which may be omitted, or may also include other additional components. Operations performed by modules, programming modules or other components according to various embodiments of the disclosure may be performed sequentially, in parallel, repeatedly or heuristically, or at least some operations may be performed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for determining a transmission path performed by a base station, the method comprising:
    determining that multiple transmission paths are to be configured for each of one or more terminals based on at least one of information on a quality of service (QOS) or information on a path state of a main transmission path of a terminal;
    grouping the one or more terminals determined to be configured with the multiple transmission paths into a terminal group; and
    determining first configuration information of the terminal group,
    wherein the first configuration information is used for configuring the multiple transmission paths for each of the one or more terminals in the terminal group.

2. The method of claim 1, wherein the main transmission path is a transmission path used when the terminal is not configured with the multiple transmission paths.

3. The method of claim 2,
    wherein the determining that multiple transmission paths are to be configured for each of the one or more terminals based on at least one of the information on the QoS or the information on the path state of the main transmission path of the terminal comprises:
        acquiring the information on the QoS and the information on the path state of the main transmission path of the terminal, and
        determining that multiple transmission paths are to be configured for the terminal in response to a value indicated by the information on the QoS being smaller than or equal to a predetermined first threshold value or an evaluation value determined based on the information on the path state of the main transmission path being smaller than or equal to a predetermined second threshold value,
    wherein the information on the path state of the main transmission path includes at least one of a channel quality indicator (CQI) of the main transmission path, a hybrid automatic repeat request (HARQ) failure rate of the main transmission path, or an HARQ retransmission rate of the main transmission path, and
    wherein the information on the QoS includes at least one of a delay related to a packet data convergence protocol (PDCP) transmission or a packet loss rate related to the PDCP transmission.

4. The method of claim 3, wherein the determining of the first configuration information of the terminal group corresponding to each terminal comprises:
    determining the terminal group corresponding to each terminal based on at least one of the path state of the main transmission path, a signal quality measurement result, a geographical location, or a service type of each of the one or more terminals, and
    acquiring the first configuration information of the terminal group.

5. The method of claim 4, wherein the determining of the terminal group corresponding to each terminal comprises:
    grouping based on the path state of the main transmission path and the service type of each of the one or more terminals to obtain at least one first terminal group; and
    for the at least one first terminal group:
        selecting candidate transmission paths for each terminal in the first terminal group based on a signal quality measurement result of each terminal in the first terminal group, and
        grouping the one or more terminals with same candidate transmission paths in the first terminal group into a first terminal subgroup as one of multiple terminal groups.

6. The method of claim 5,
    wherein the candidate transmission paths include a transmission path whose signal quality is higher than a predetermined third threshold value, and
    wherein the grouping of the one or more terminals with the same candidate transmission paths in the first terminal group into the first terminal subgroup as one of multiple terminal groups comprises:
        removing one or more terminals from the first terminal subgroup based on a geographical location of each terminal in the first terminal group, and
        taking the first terminal subgroup after removing the one or more terminals as one of multiple terminal groups.

7. The method of claim 5,
    wherein the determining of the first configuration information comprises determining multiple transmission paths for each terminal in the terminal group,
    wherein the determining of the multiple transmission paths for each terminal in the terminal group comprises:
        repeatedly performing an operation of selecting a transmission path with a highest signal quality which has not been selected from candidate transmission paths of the terminal, until a preset condition is satisfied, and
        determining the selected one or more transmission paths as multiple transmission paths for each terminal in the terminal group, and wherein the main transmission path is determined as a primary path.

8. The method of claim 7,
    wherein, if an assisting node has been determined, when the transmission path with the highest signal quality which has not been selected is selected from the candidate transmission paths of the terminal, the selection is made only from the transmission path related to a hosting node or the transmission path related to the determined assisting node, or wherein, if the assisting node has not been determined, when the transmission path with the highest signal quality that has not been selected is selected from the candidate transmission paths of the terminal, the selection is made from the transmission path related to the hosting node and transmission paths related to other nodes, and wherein, when the selected transmission path is not in the hosting node and the assisting node has not been determined, a node where the transmission path is located is determined to be the assisting node.

9. The method of claim 8,
wherein the preset condition includes at least one of:
  a sum of signal qualities of the selected one or more transmission paths being greater than a predetermined fourth threshold value, or a number of the selected one or more transmission paths being at least a predetermined fifth threshold value, and
wherein the first configuration information includes one or more of:
  identification information of the assisting node,
  identification information of a path related to the hosting node among the selected one or more transmission paths, or
  identification information of a path related to the assisting node among the selected one or more transmission paths.

10. The method of claim 4,
wherein, if a value indicated by information on QoS of at least one of the one or more terminals is smaller than a sixth threshold value during a predetermined time period, a terminal group corresponding to the at least one terminal is re-determined, and
wherein the sixth threshold value is greater than a value corresponding to QoS requirements of the PDCP transmission.

11. The method of claim 10, further comprising:
receiving information on path states of one or more transmission paths related to an assisting node from the assisting node.

12. The method of claim 11, further comprising:
determining whether to activate data packet duplication based on path states of one or more transmission paths related to a hosting node and the path states of the one or more transmission paths related to the assisting node,
wherein the path states of the one or more transmission paths related to the hosting node include the path states of the one or more transmission paths related to the hosting node at a latest moment or the path states of the one or more transmission paths related to the hosting node at a current moment, or
wherein the path states of the one or more transmission paths related to the assisting node reported by the assisting node include the path states of the one or more transmission paths related to the assisting node at the latest moment or the path states of the one or more transmission paths related to the assisting node at the current moment.

13. The method of claim 12, further comprising:
selecting multiple transmission paths for a data packet duplication transmission based on the path states of the one or more transmission paths related to the hosting node and the path states of the one or more transmission paths related to the assisting node; and
transmitting second configuration information to at least one terminal, the second configuration information including information on whether to activate data packet duplication and information on multiple transmission paths for data packet duplication transmission.

14. The method of claim 13, further comprising, in response to determining that one of the at least one terminal satisfies a predetermined condition for a consecutive second predetermined time, configuring a single transmission path for the terminal, the single transmission path is a primary path, and the predetermined condition includes at least one of:
  a selected transmission path for the terminal including the primary path and meeting QoS requirements of the PDCP transmission, or
  a value indicated by information on the QoS being greater than or equal to a predetermined eighth threshold value.

15. A base station for determining a transmission path, the base station comprising:
  a transceiver;
  at least one memory storing instructions; and
  at least one processor configured to execute the stored instructions to:
    determine that multiple transmission paths are to be configured for each of one or more terminals based on at least one of information on a quality of service (QOS) or information on a path state of a main transmission path of a terminal,
    group the one or more terminals determined to be configured with the multiple transmission paths into a terminal group, and
    determine first configuration information of the terminal group,
  wherein the first configuration information is used for configuring the multiple transmission paths for each of the one or more terminals in the terminal group.

16. The base station of claim 15, wherein the main transmission path is a transmission path used when the terminal is not configured with the multiple transmission paths.

17. The base station of claim 16,
wherein the at least one processor is further configured to execute the stored instructions to:
  acquire the information on the QoS and the information on the path state of the main transmission path of the terminal, and
  determine that multiple transmission paths are to be configured for the terminal in response to a value indicated by the information on the QoS being smaller than or equal to a predetermined first threshold value or an evaluation value determined based on the information on the path state of the main transmission path being smaller than or equal to a predetermined second threshold value,
wherein the information on the path state of the main transmission path includes at least one of a channel quality indicator (CQI) of the main transmission path, a hybrid automatic repeat request (HARQ) failure rate of the main transmission path, or an HARQ retransmission rate of the main transmission path, and
wherein the information on the QoS includes at least one of a delay related to a packet data convergence protocol (PDCP) transmission or a packet loss rate related to the PDCP transmission.

18. The base station of claim 17, wherein the at least one processor is further configured to execute the stored instructions to:

determine the terminal group corresponding to each terminal based on at least one of the path state of the main transmission path, a signal quality measurement result, a geographical location, or a service type of each of the one or more terminals, and acquire the first configuration information of the terminal group.

19. The base station of claim 18, wherein the at least one processor is further configured to execute the stored instructions to:

group based on the path state of the main transmission path and the service type of each of the one or more terminals to obtain at least one first terminal group; and for the at least one first terminal group:

select candidate transmission paths for each terminal in the first terminal group based on a signal quality measurement result of each terminal in the first terminal group, and group the one or more terminals with same candidate transmission paths in the first terminal group into a first terminal subgroup as one of multiple terminal groups.

20. One or more non-transitory computer-readable storage media storing computer-executable instructions that, when executed by at least one processor of a base station, cause the base station to perform operations, the operations comprising:

determining that multiple transmission paths are to be configured for each of one or more terminals based on at least one of information on a quality of service (QOS) or information on a path state of a main transmission path of a terminal;

grouping the one or more terminals determined to be configured with the multiple transmission paths into a terminal group; and determining first configuration information of the terminal group, wherein the first configuration information is used for configuring the multiple transmission paths for each of the one or more terminals in the terminal group.

* * * * *